(12) United States Patent
Yaikhom

(10) Patent No.: US 12,433,481 B2
(45) Date of Patent: Oct. 7, 2025

(54) OPTICAL COHERENCE TOMOGRAPHY ANGIOGRAPHY DATA PROCESSING FOR REDUCING PROJECTION ARTEFACTS

(71) Applicant: OPTOS PLC, Dunfermline (GB)

(72) Inventor: Gagarine Yaikhom, Dunfermline (GB)

(73) Assignee: OPTOS PLC, Dunfermline (GB)

( * ) Notice: Subject to any disclaimer, the term of this patent is extended or adjusted under 35 U.S.C. 154(b) by 476 days.

(21) Appl. No.: 18/087,605

(22) Filed: Dec. 22, 2022

(65) Prior Publication Data
US 2023/0320583 A1  Oct. 12, 2023

(30) Foreign Application Priority Data
Mar. 28, 2022 (EP) .................................. 22164712

(51) Int. Cl.
*A61B 3/00* (2006.01)
*A61B 3/10* (2006.01)
(Continued)

(52) U.S. Cl.
CPC ............ *A61B 3/102* (2013.01); *A61B 3/0025* (2013.01); *A61B 3/1241* (2013.01); *G06T 5/77* (2024.01); *G06T 2207/10101* (2013.01)

(58) Field of Classification Search
CPC ..... A61B 3/0025; A61B 3/102; A61B 3/1241; A61B 5/0066; G06T 5/77; G06T 7/0012; G06T 2207/10101; G06T 2207/30041
See application file for complete search history.

(56) References Cited

U.S. PATENT DOCUMENTS

| 2017/0238877 A1 | 8/2017 | Hsiao et al. |
| 2021/0100448 A1 | 4/2021 | Hurst |
| 2021/0358096 A1 | 11/2021 | Mei et al. |

FOREIGN PATENT DOCUMENTS

| JP | 2018-000373 A | 1/2018 |
| JP | 2019-511940 A | 5/2019 |

(Continued)

OTHER PUBLICATIONS

JP Office Action Mailed on Mar. 5, 2024 for JP Application No. 2022212215, 7 page(s).

(Continued)

*Primary Examiner* — Jack Dinh
(74) *Attorney, Agent, or Firm* — FAEGRE DRINKER BIDDLE & REATH

(57) ABSTRACT

A method of processing optical coherence tomography angiography, OCTA, data comprising an array of columns of data elements to generate corrected OCTA data showing reduced projection artefacts in enface projection, the OCTA data having been generated from repeat B-scans, the method comprising: (i) calculating a correlation value indicative of a correlation between a first sequence of the data elements, whose respective locations within respective B-scans correspond to a location of a first data element within the array, and a second sequence of the data elements, whose respective locations within respective B-scans correspond to a location of a second data element within the array; (ii) calculating a correction for the second data element based on the first data element and the calculated correlation value; and (iii) applying the calculated correction to the second data element, wherein processes (i) to (iii) are performed multiple times to generate the corrected OCTA data.

20 Claims, 11 Drawing Sheets

(51) Int. Cl.
*A61B 3/12* (2006.01)
*G06T 5/00* (2024.01)
*G06T 5/77* (2024.01)

(56) References Cited

FOREIGN PATENT DOCUMENTS

| JP | 2019-180692 A | 10/2019 |
| JP | 2020-146433 A | 9/2020 |
| JP | 2021-074529 A | 5/2021 |
| JP | 2021-180838 A | 11/2021 |
| WO | 2021/198112 A1 | 7/2021 |
| WO | 2021/155268 A1 | 8/2021 |
| WO | 2021/219729 A1 | 11/2021 |

OTHER PUBLICATIONS

Extended European Search Report (EESR) dated Sep. 30, 2022 issued in European patent application 22 164 712.6 (5 sheets).
Zhang, et al., "Projection Artifact Removal Improves Visualization and Quantitation of Macular Neovascularization Images by Optical Coherence Tomography Angiography", Ophthalmology Retina, 2017, 1(2), pp. 124-136 (26 sheets).
Liu et al., "Projection Artifact Suppression For Inner Retina In OCT Angiography", IEEE 16th International Symposium on Biomedical Imaging, 2019, pp. 592-596 (5 sheets).
Spaide et al., "Image Artifacts In Optical Coherence Angiography", Retina, 2015, 35(11), pp. 2163-2180 (38 sheets).
Turgut B., "Optical Coherence Tomography Angiography—General View", European Ophthalmic Review, 2016, 10(1), pp. 39-42 (4 sheets).
Fayed et al., "ProjectionResolved Optical Coherence Tomography Angiography To Distinguish Flow Signal In Retinal Angiomatous Proliferation From Flow Artifact", PLOS One 14(5), May 15, 2019 (11 sheets).

OPTICAL COHERENCE TOMOGRAPHY ANGIOGRAPHY DATA PROCESSING FOR REDUCING PROJECTION ARTEFACTS

This application claims the benefit of priority of European Patent Application No. EP 22 164 712.6 filed Mar. 28, 2022, the content of which is incorporated by reference herein in its entirety, as if set forth fully herein.

TECHNICAL FIELD

Example aspects herein generally relate to the field of optical coherence tomography angiography (OCTA) and, more particularly, to Projection Artefact Removal (PAR) techniques for removing projection artefacts from OCTA enface projections.

BACKGROUND

OCTA is a non-invasive imaging technique which uses low-coherence interferometry to obtain structural and functional (blood flow) information of an imaged body part in tandem. OCTA has been used in various medical fields. In ophthalmology, for example, OCTA has been used to diagnose a variety of diseases such as Choroidal Neovascularisation (CNV), age-related macular degeneration (AMD), diabetic retinopathy, artery and vein occlusions, sickle cell disease and glaucoma.

Algorithms for generating OCTA data compare differences in the backscattered OCT signal between repeat B-scans of a common OCT scan region of the body part (i.e. B-scans of the same cross-section of the body part, which have been acquired at different times) to construct an OCTA volume comprising OCTA flow signals, of which an enface projection can be derived that maps out regions of blood flow in the imaged body part. OCTA relies on the principle that parts of the OCT scan region containing moving red blood cells give rise to greater fluctuations in backscattered OCT signal over time than parts of the OCT scan region containing no blood flow, i.e. static tissue.

Several types of OCTA signal extraction and processing methods have been developed, in which repeat OCT scans are processed in different ways to map the vasculature imaged therein, for example split-spectrum amplitude decorrelation angiography (SSADA), optical microangiography (OMAG) and OCT angiography ratio analysis (OCTARA). A review of these types of OCTA is provided in "Optical Coherence Tomography Angiography-A General View" by Turgut, European Ophthalmic Review, 2016; 10 (1): 39-42, the contents of which are incorporated herein by reference in their entirety.

In many applications of OCTA, projection artefacts are often observed in enface projections of the OCTA volume, which take the appearance of blood vessels in OCTA enface projections taken at deeper plexus that can be mistaken for genuine blood vessels. For example, in OCTA of the retina of an eye, projection artefacts tend to be especially prominent at high-reflectance tissue layers, such as the Retina Pigment Epithelium (RPE). In this case, projection artefacts are caused by the scattering of photons from vasculature in a superficial layer of the retina. An example of an enface projection of such superficial layer is shown in FIG. 1A. These projection artefacts are observable as false OCTA flow signals in an enface projection of a deeper, high-reflectance layer such as the RPE, as illustrated in the example of FIG. 1B. The origin of projection artefacts will now be briefly explained with reference to FIG. 2.

As illustrated in FIG. 2, a light source of the OCTA scanner (not shown) emits multiple light beams 2 to produce each A-scan of a series of A-scans that are arrayed to form a B-scan (five such beams are shown). The light beams 2 enter the retina through the inner limiting membrane (ILM) 4 and, depending on the reflectance and scattering properties of the tissues that the photons in the beam 2 encounter along the way, some of the photons are reflected back, some of the photons are scattered, and some enter the deeper layers. As illustrated in FIG. 2, some of the photons are scattered by red blood corpuscles/cells (RBCs) 6 in blood vessels 8. As the RBCs 6 are in motion, the scattering pattern caused by the RBCs 6 changes with time, as blood flows inside the blood vessels 8. Hence, when temporally separated B-scans, namely B-scan 1 to B-scan 4 in this example, are taken at the same location on the retina, variations in the reflectance at a deeper, high-reflectance layer 10 are observed. Since OCTA flow signals are extracted by identifying variations in reflectance, the variations caused by the scattering due to moving RBCs 6 can be incorrectly detected as false flow in the deeper layer 10. Thus, while the variability of the scattering pattern is what makes OCTA fundamentally possible, it also causes the projection artefacts that can prevent accurate diagnosis using OCTA.

Projection Artefact Removal (PAR) algorithms are often employed in OCTA to remove these artefacts from enface projections. PAR is particularly important when OCTA is used for clinical diagnosis, as projection artefacts can increase the likelihood of misdiagnosis and therefore put patients at risk. It is therefore paramount that these artefacts are removed before OCTA results are delivered to a user. Known PAR algorithms typically employ image processing techniques to remove projection artefacts from enface projection images, to deliver a final artefact-free enface projection image that can be displayed to the user. PAR of this kind is a standard feature of ophthalmic OCTA-capable devices, for example.

SUMMARY

The present inventor has devised, in accordance with a first example aspect herein, a computer-implemented method of processing OCTA data comprising an array of columns of data elements, which represents a distribution of vasculature in an imaged region of a body part, to generate corrected OCTA data showing reduced projection artefacts in enface projection relative to the OCTA data, the data elements in each column of the array of columns having been generated from data elements of OCT data that are correspondingly located in A-scans of respective B-scans of a set of repeat B-scans of the imaged region of the body part. The method comprises processing data elements of the OCT data and data elements of the OCTA data by processes of: (i) calculating a correlation value that is indicative of a degree of correlation between a first sequence of data elements of the OCT data, wherein respective locations of the data elements of the first sequence within the respective B-scans correspond to a location of a first data element within the array of columns of the OCTA data, and a second sequence of data elements of the OCT data, wherein respective locations of the data elements of the second sequence within the respective B-scans correspond to a location of a second data element within the array of columns of the OCTA data, the second data element being further along in an axial direction of the OCTA data, in which the columns of the OCTA data extend, than the first data element; (ii) using the first data element and the calculated correlation value to calculate a correction for the second data element; and (iii) applying the calculated correction to the second data element, wherein processes (i) to (iii) are performed multiple times, using a different combination of a data element of the OCTA data as the first data element and a data element of the OCTA data as the second data element in each performance of processes (i) to (iii), so as to generate the corrected OCTA data.

The present inventor has also devised, in accordance with a second example aspect herein, a computer program comprising computer-readable instructions which, when executed by a computer, cause the computer to perform a method according to the first example aspect set out above. The computer program may be stored on a non-transitory computer-readable storage medium (e.g. a computer hard disk, CD or a memory stick) or carried by a signal (e.g. an Internet download).

The present inventor has further devised, in accordance with a third example aspect herein, an apparatus arranged to process OCTA data comprising an array of columns of data elements which represents a distribution of vasculature in an imaged region of a body part, to generate corrected OCTA data showing reduced projection artefacts in enface projection relative to the OCTA data, the data elements in each column of the array of columns having been generated from data elements of OCT data that are correspondingly located in A-scans of respective B-scans of a set of repeat B-scans of the imaged region of the body part. The apparatus comprises a hardware component arranged to execute a method comprising processing data elements of the OCT data and data elements of the OCTA data by processes of: (i) calculating a correlation value that is indicative of a degree of correlation between a first sequence of data elements of the OCT data, wherein respective locations of the data elements of the first sequence within the respective B-scans correspond to a location of a first data element within the array of columns of the OCTA data, and a second sequence of data elements of the OCT data, wherein respective locations of the data elements of the second sequence within the respective B-scans correspond to a location of a second data element within the array of columns of the OCTA data, the second data element being further along in an axial direction of the OCTA data, in which the columns of the OCTA data extend, than the first data element; (ii) using the first data element and the calculated correlation value to calculate a correction for the second data element; and (iii) applying the calculated correction to the second data element. The apparatus is arranged to perform processes (i) to (iii) multiple times, using a different combination of a data element of the OCTA data as the first data element and a data element of the OCTA data as the second data element in each performance of processes (i) to (iii), so as to generate the corrected OCTA data. The apparatus further comprises an output component, which is arranged to output the corrected OCTA data.

BRIEF DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

DETAILED DESCRIPTION OF EXAMPLE EMBODIMENTS

There are described in the following volumetric axial-based processing algorithms for removing projection artefacts from OCTA enface projections. In contrast to conventional projection artefact removal algorithms as outlined above, where the artefacts are removed by image processing of the already generated enface projections, the projection artefact removal techniques described herein may remove or reduce false signals in A-scans of the OCTA volume before an enface projection is generated. The described techniques may use relevant axial information available in the OCTA volume to suppress or eliminate a false signal component caused by the anatomy of the retina from a voxel values in the OCTA volume, resulting in corrected voxel values that better reflect the true OCTA signal. This may make the projected enface look more natural when the artefacts have been removed, as compared to an enface projection generated by processing the final enface, in which artefacts are removed in an ad hoc manner. This is because the averaging of the corrected axial signals may remove sharp changes in the generated enface. Furthermore, since OCTA signals that are sources of an artefact in the OCTA image are corrected, rather than the already projected OCTA enface images, the artefact removal may be more accurate.

Figure 1C:
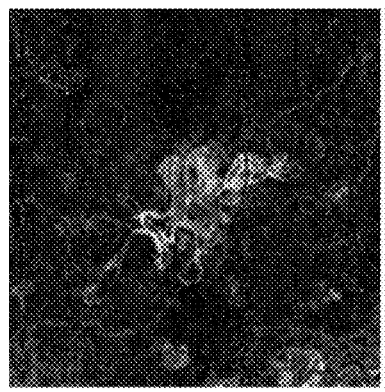
FIG. 1C is an example of an OCTA enface projection of the deeper, high-reflectance layer in the imaged region of a retina, which has been generated by the apparatus of the example embodiment.
Figure 1B:
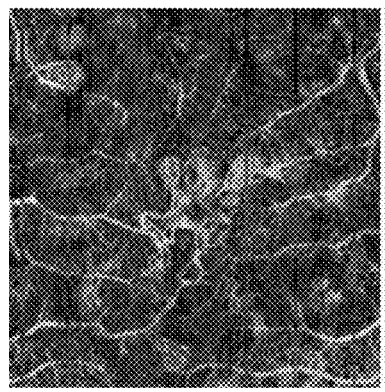
FIG. 1B is an example OCTA enface projection of a deeper, high-reflectance layer in the imaged region of a retina.
Figure 1A:
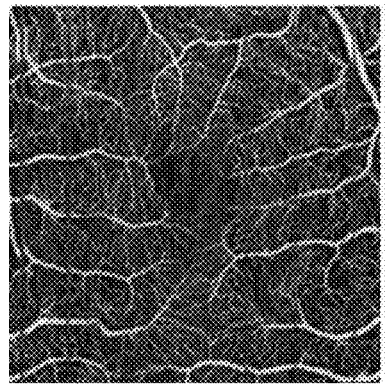
FIG. 1A is an example OCTA enface projection of a superficial layer in an imaged region of a retina.
Figure 2:
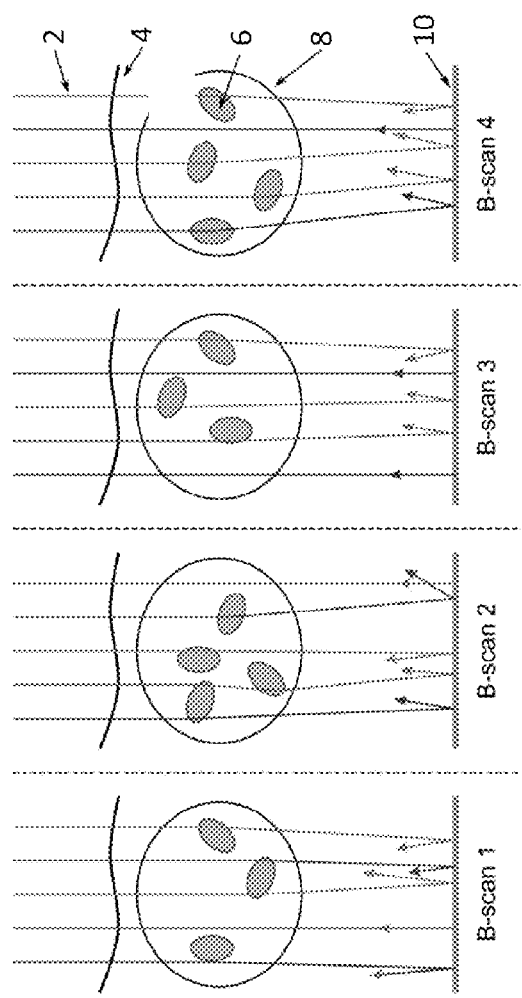
FIG. 2 is a schematic illustration of the propagation of light beams through the retina during acquisition of four repeat B-scans of a common imaged region of a retina.
Figure 3A:
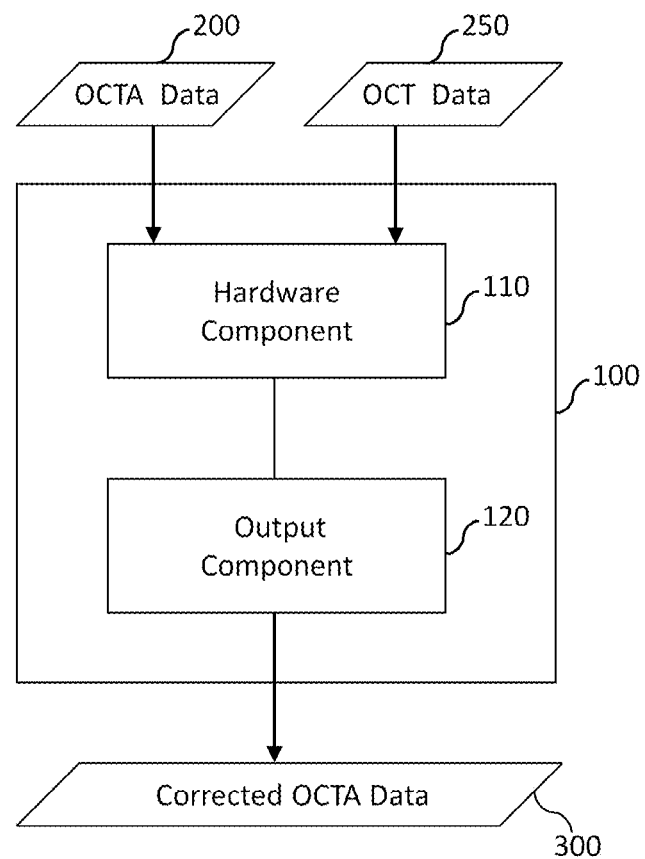
FIG. 3A is a schematic illustration of an apparatus of an example embodiment herein for processing OCTA data to generate corrected OCTA data showing reduced projection artefacts in enface projection.

FIG. 3A is a schematic illustration of an apparatus 100 according to an example embodiment, which is arranged to process OCTA data 200 and related OCT data 250 to generate corrected OCTA data 300 showing reduced projection artefacts in enface projection relative to the OCTA data 200, i.e. corrected OCTA data 300 whose enface projection has fewer and/or less prominent projection artefacts than an enface projection of the OCTA data 200.

Figure 3B:
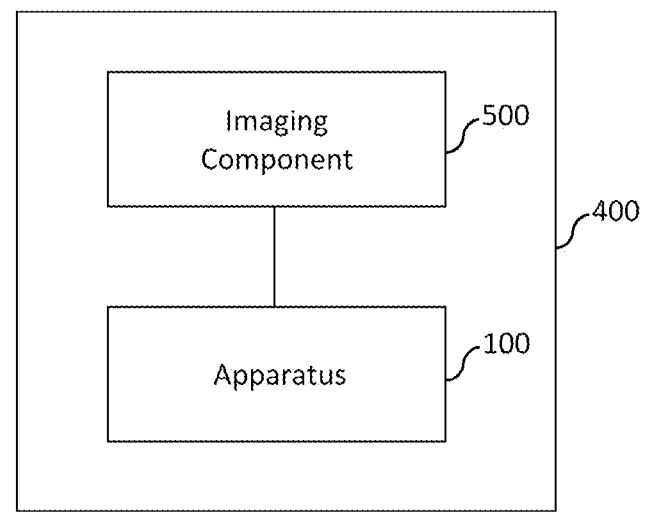
FIG. 3B is a schematic illustration of an imaging device having an imaging component arranged to acquire the OCTA data, and the apparatus of the example embodiment for processing the OCTA data to generate the corrected OCTA data.

The apparatus 100 may be provided in the form of a stand-alone device (e.g. a desktop PC or a laptop computer) dedicated to data processing or it could, as in the present example embodiment, form part of an imaging device 400, as illustrated in FIG. 3B. The imaging device 400 comprises an imaging component 500, which is arranged to image a region of the retina (or other body part) and acquire the OCTA data 200 representing a distribution of vasculature in the imaged region. The imaging device 400 also has the apparatus 100 of the example embodiment, which is arranged to process the acquired OCTA data 200 to generate the corrected OCTA data 300 having reduced projection artefacts in enface projection relative to the OCTA data 200.

The OCTA data 200 comprises an array of columns of data elements representing a distribution of vasculature in a region of a body part that has been imaged by an OCT data acquisition device (not shown). In the present example embodiment, the OCTA data 200 comprises a two-dimensional array of columns of data elements (also referred to herein as "voxels") representing a distribution of vasculature in an imaged three-dimensional region of the body part, although the techniques described herein are also applicable to the processing of OCTA data in the form of a one-dimensional array of columns of data elements (also referred to herein as "pixels") representing a distribution of vasculature in an imaged two-dimensional region (slice) of the body part. Each of the data elements represents a respective value that is indicative of a variability of a backscattered (OCT) signal, which can be used to differentiate regions of blood flow from regions of static tissue.

The body part comprises a portion of the retina of an eye in the present example embodiment, although it will be appreciated that the techniques described herein are generally applicable to the processing of OCTA data acquired from any other body parts, in whose OCTA enface projection images projection artefacts tend to be observed.

Figure 4:
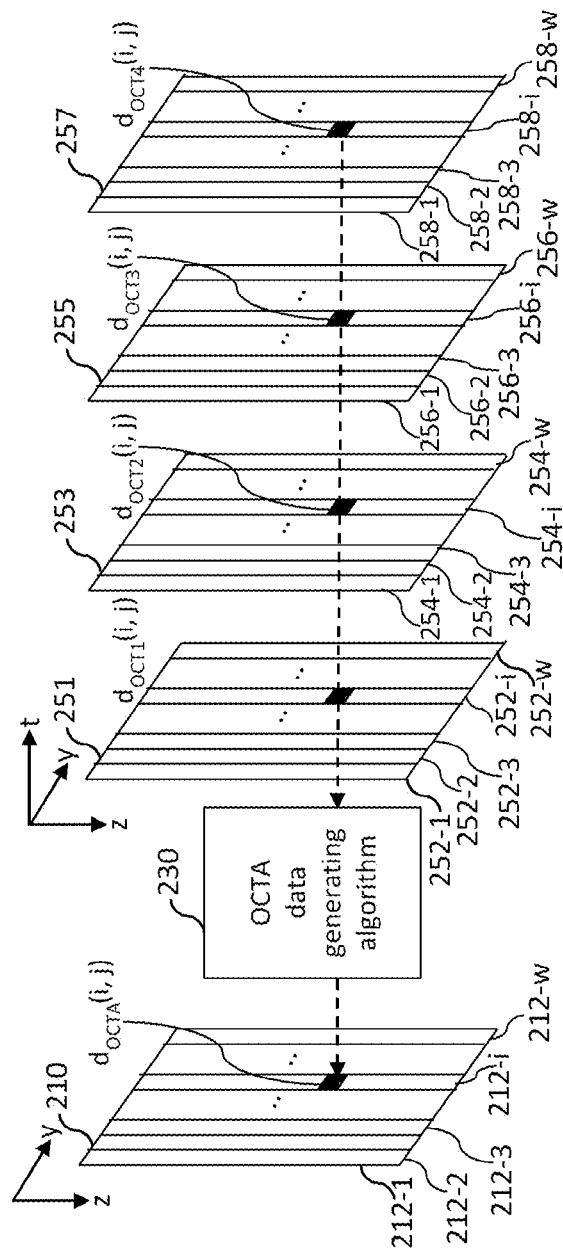
FIG. 4 is a schematic illustration of the processing of repeat OCT B-scans by an OCTA data-generating algorithm to generate OCTA data.

FIG. 4 is a schematic illustration of a one-dimensional array 210 of columns, 212-1 to 212-W, of OCTA data elements, which forms a slice of the OCTA data 200 at one of a number E of scan elevations arranged along an x-axis, at which respective repeat B-scans, 251, 253, 255 and 257, from which the one-dimensional array 210 is derived, have been acquired by the OCT data acquisition device. These repeat B-scans cover a common two-dimensional region of the imaged retina at the scan elevation, which region extends along a first (y-) axis of a Cartesian coordinate system that is taken to be within a surface of an approximately planar portion of the retina in the imaged three-dimensional region of the eye (i.e. the surface of the retina adjacent to the vitreous humour of the eye), and along an axial direction (z-axis of the Cartesian coordinate system), which is in a depth direction of the retina (i.e. in a direction that spans the depth of the retina from the vitreous humor to the choroid and sclera).

As illustrated in FIG. 4, the four repeat B-scans of the OCT data 250 have been taken at the same scan elevation at different times (as illustrated by their spacing along the time axis, t, in FIG. 4), and are processed by an OCTA data generating algorithm 230 to generate the slice of OCTA data 210. The data elements in each column 212-1 to 212-W of the array 210 of columns of the OCTA data 300 may be generated using any type of OCTA data generating algorithm 230 well-known to those versed in the art, from data elements of OCT data 250 that are correspondingly located in A-scans, 252-1 to 252-W, 254-1 to 254-W, 256-1 to 256-W and 258-1 to 258-W, of respective B-scans of the repeat B-scans 251, 253, 255 and 257 of the imaged region of the body part that have been acquired by the OCT data acquisition device. In other words, the data elements in each column 212-1 to 212-W of the array 210 of columns are generated from data elements of OCT data 250 in A-scans that are correspondingly located in respective B-scans 251, 253, 255 and 257 of the set of repeat B-scans of the imaged region of the retina. By way of an example, data element $d_{OCTA}(i, j)$ in column 212-$i$ of the array 210 is generated by the OCTA data generating algorithm 230 on the basis of data elements $d_{OCT1}(i, j)$, $d_{OCT2}(i, j)$, $d_{OCT3}(i, j)$ and $d_{OCT4}(i, j)$ of the OCT data 250 that are correspondingly located in A-scans 252-$i$, 254-$i$, 256-$i$ and 258-$i$ of the respective B-scans, 251, 253, 255 and 257 of the imaged region of the body part.

Referring again to FIG. 3A, the apparatus 100 comprises a hardware component 110, which is arranged to generate the corrected OCTA data 300 by processing data elements of the OCT data 250 and data elements of the OCTA 300 by techniques described herein below. The apparatus 100 further comprises an output component 120, which is arranged to output the corrected OCTA data 300, for example to display an enface projection of the corrected OCTA data 300, which may be generated by the hardware component 110, on a display device such as a computer monitor, for example.

The hardware component 110 may comprise any kind of computer hardware that is configured to execute the method of processing data elements of the OCT data 250 and data elements of the OCTA 300 of the example embodiment described below. The hardware component 110 may, as in the present example embodiment, comprise a processor and a memory storing instructions which, when executed by the processor, cause the processor to execute the method. Alternatively, the hardware component 110 may comprise an application-specific integrated circuit (ASIC), a field-programmable gate array (FPGA) or other electronic circuit that is configured to execute the method.

Figure 5:
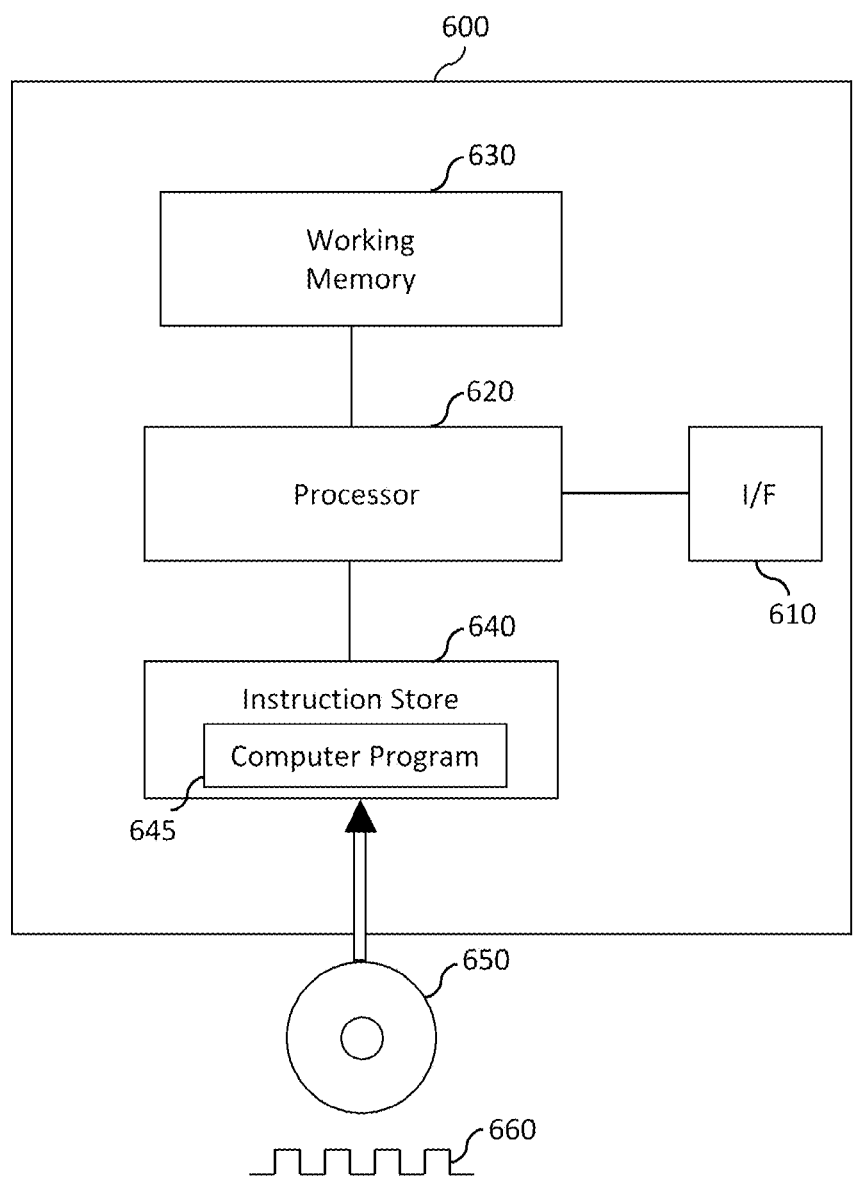
FIG. 5 illustrates an example hardware implementation of the apparatus of the example embodiment, in a programmable signal processing apparatus.

FIG. 5 is a schematic illustration of a programmable signal processing hardware 600, which may be configured to process the OCTA data 200 and the related OCT data 250 using the techniques described herein, and which can function as the hardware component 110 and the output component 120 of the example embodiment. The programmable signal processing apparatus 600 comprises a communication interface (I/F) 610, for receiving the OCTA data 200 and the OCT data 250, and outputting the generated corrected OCTA data 300 and/or a graphical representation of the corrected OCTA data 300 (for example, in the form of an enface projection of the corrected OCTA data 300) for displaying on a display, such a computer screen or the like. The communication interface (I/F) 610 thus provides an example implementation of the output component 120. The signal processing apparatus 600 further comprises a processor (e.g. a Central Processing Unit, CPU, and/or a Graphics Processing Unit, GPU) 620, a working memory 630 (e.g. a random access memory) and an instruction store 640 storing a computer program 645 comprising the computer-readable instructions which, when executed by the processor 620, cause the processor 620 to perform various functions including those of the hardware component 110 described herein. The working memory 630 stores information used by the processor 620 during execution of the computer program 645. The instruction store 640 may comprise a ROM (e.g. in the form of an electrically erasable programmable read-only memory (EEPROM) or flash memory) which is pre-loaded with the computer-readable instructions. Alternatively, the instruction store 640 may comprise a RAM or similar type of memory, and the computer-readable instructions of the computer program 645 can be input thereto from a computer program product, such as a non-transitory, computer-readable storage medium 650 in the form of a CD-ROM, DVDROM, etc. or a computer-readable signal 660 carrying the computer-readable instructions. In any case, the computer program 645, when executed by the processor 620, causes the processor 620 to perform a method of generating corrected OCTA data 300 as described herein. In other words, the apparatus 100 of the example embodiment may comprise a computer processor 620 and a memory 640 storing computer-readable instructions which, when executed by the computer processor 620, cause the computer processor 620 to perform a method of processing the OCTA data 200 and the OCT data 250 to generate corrected OCTA data 300 showing reduced projection artefacts in enface projection relative to the OCTA data 200 as described below.

It should be noted, however, that one or both of the hardware component 110 and the output component 120 may alternatively be implemented in non-programmable hardware, such as an ASIC, an FPGA or other integrated circuit dedicated to performing the respective function(s) of the component(s).

Figure 6:
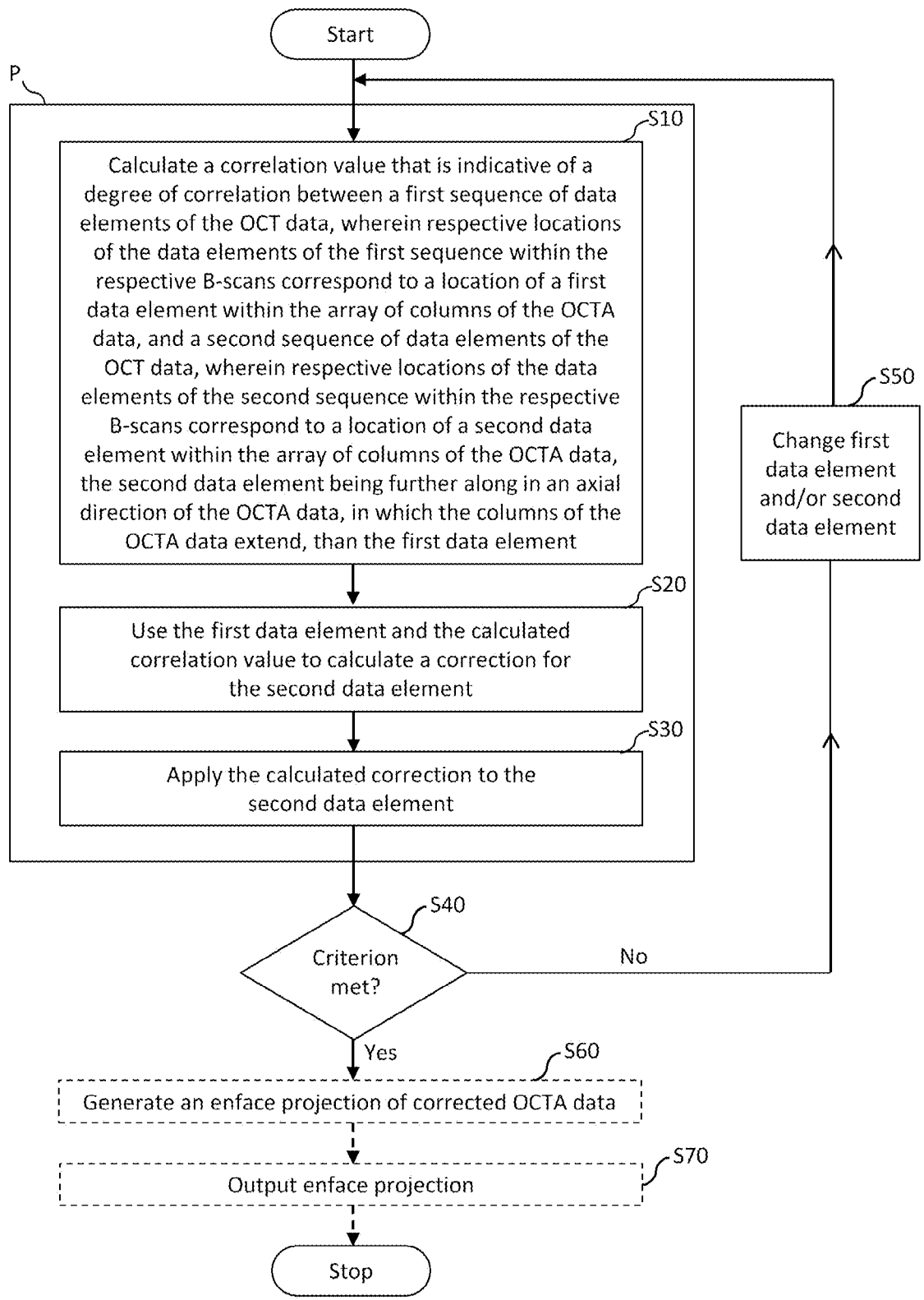
FIG. 6 is a flow diagram illustrating a method of processing OCTA data to generate corrected OCTA data showing reduced projection artefacts in enface projection relative to the OCTA data, according to an example embodiment.

FIG. 6 is a flow diagram illustrating a method by which the apparatus 100 of the present example embodiment processes OCTA data 200 to generate corrected OCTA data 300 showing reduced projection artefacts in enface projection relative to the OCTA data 200. In general, the hardware component 110 processes data elements of the OCT data 250 and data elements of the OCTA data 200 by repeatedly performing the illustrated process P defined by a sequence of processes S10, S20 and S30, using a different combination of a data element of the OCTA data 200 as the first data element and a data element of the OCTA data 200 as the second data element in each performance of the sequence of processes S10, S20 and S30. This sequence of processes may be repeated in several different ways so as to generate the corrected OCTA data 300. Some examples of how the sequence of processes can be repeated to generate the corrected OCTA data 300 are described in the following.

As illustrated in FIG. 6, the sequence of processes comprises a process S10, wherein the hardware component 110 calculates a correlation value that is indicative of a degree of correlation between (i) a first sequence of data elements of the OCT data 250, wherein respective locations of the data elements of the first sequence within the respective B-scans correspond to (in the sense of having the same array coordinates as) a location of a first data element within the array of columns of the OCTA data 200, and (ii) a second sequence of data elements of the OCT data 250, wherein respective locations of the data elements of the second sequence within the respective B-scans correspond to (i.e. have the same array coordinates as) a location of a second data element within the array of columns of the OCTA data 200, the second data element being further along in the axial (i.e. z-axis) direction of the OCTA data 200, in which the columns of the OCTA data 200 extend, than the first data element. Data elements (voxels) of the OCTA data 200 arrayed along the axial (z-axis) direction of the three-dimensional OCTA data array contain OCTA data from corresponding points in the retina that extend in a depth direction of the retina, i.e. into the retina from its light-receiving surface. Thus, the second data element is below the first data element in the array of columns of the OCTA data 200, in the (z-axis) direction of the OCTA data array, along which the columns extend, such that the second data element can include a data component caused by scattering of light from a location in the retina corresponding to a location of a data element above the second data element in the array of columns of the OCTA data 200, which data component causes a projection artefact in enface projection of the OCTA data 200. The second OCTA data element may, as in the present example embodiment, be in the same column of the OCTA data 200 as the first OCTA data element. The data elements of the first sequence appear in the same order as the acquisition order of the respective repeat B-scans containing these data elements. Similarly, the data elements of the second sequence appear in the same order as the acquisition order of the respective repeat B-scans containing these data elements.

Figure 7:
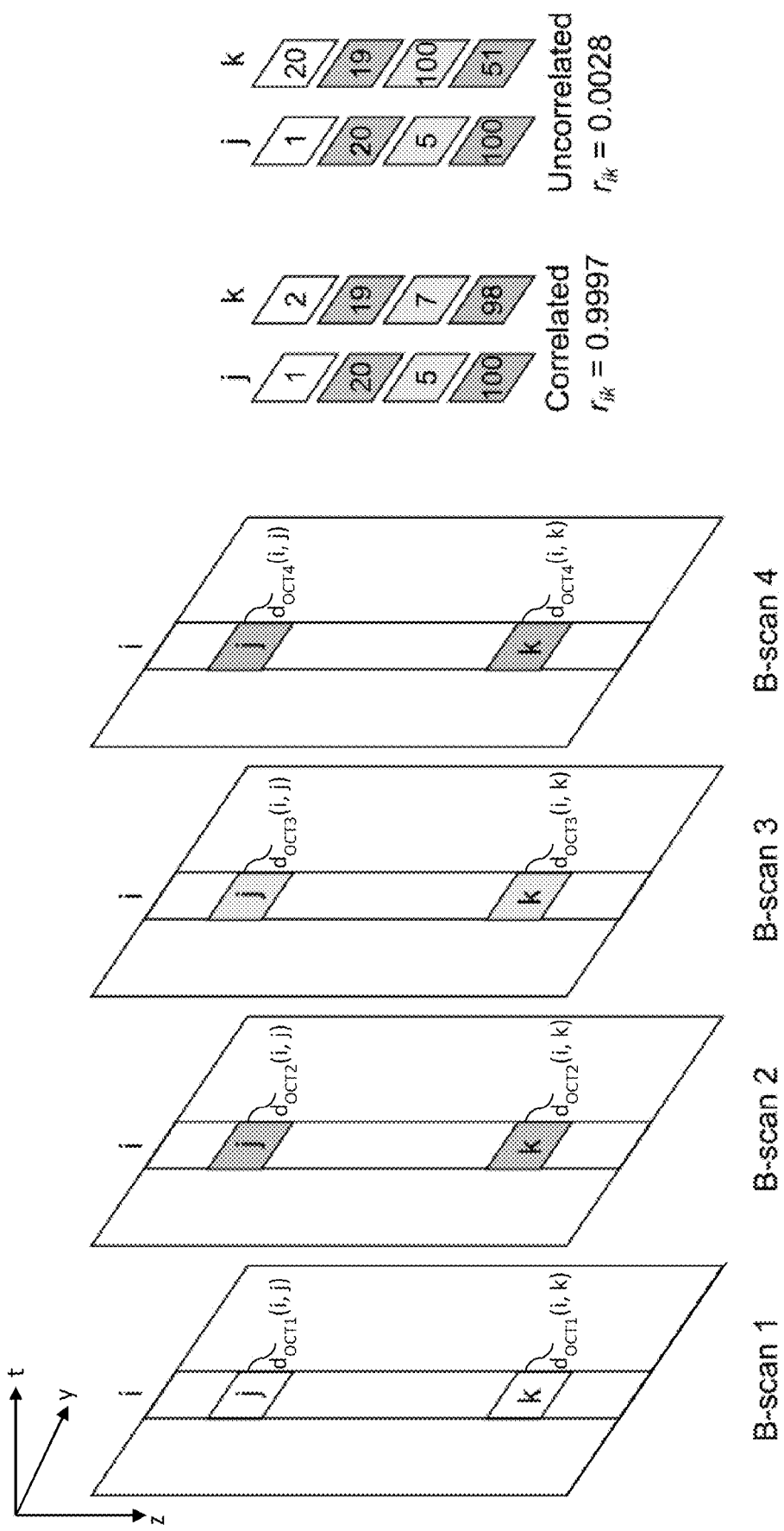
FIG. 7 is a schematic illustration of OCT data elements that are correspondingly located in respective repeat B-scans and used to calculate a correlation value.

FIG. 7 is a schematic illustration of OCT data elements that are correspondingly located in respective repeat B-scans, and on the basis of which a correlation value is calculated by the hardware component 110. In this illustration, the first sequence of data elements (whose respective locations in B-scans 1 to 4 shown in FIG. 7 correspond to the location of OCTA data element $d_{OCTA}(i, j)$ in the array 210 of columns of the OCTA data 300) is represented by OCT data elements $d_{OCT1}(i, j)$, $d_{OCT2}(i, j)$, $d_{OCT3}(i, j)$ and $d_{OCT4}(i, j)$. Furthermore, the second sequence of data elements (whose respective locations in B-scans 1 to 4 shown in FIG. 7 correspond to the location of OCTA data element $d_{OCTA}(i, k)$ in the array 210) is represented by OCT data elements $d_{OCT1}(i, k)$, $d_{OCT2}(i, k)$, $d_{OCT3}(i, k)$ and $d_{OCT4}(i, k)$, where i, j and k are integers, and k>j. As shown on the right-hand side of FIG. 7, a correlation value, in the example form of correlation coefficient $r_{jk}$, is calculated by the hardware component 110 on the basis of the first and second sequences of OCT data elements in process S10 is higher (taking the exemplary value of 0.9997) in case the OCT data element values vary similarly in the two sequences, than in a case where the variations are dissimilar (taking the exemplary value of 0.0028).

A correlation coefficient is calculated in process S10 in order to prevent mis-correction of true OCTA signals, while still retaining the ability to correct false OCTA signals that are the source of projection artefacts. The correlation coefficient (its absolute value) may be regarded as a probabilistic discriminator between true and false OCTA signals, and since the degree of false signals at a voxel are correlated to the variance in the reflectance of the repeat voxels in the upper retinal layers, this correlation can be used as a correction weighting so that stronger correlation means higher likelihood that the signal is a false signal, and vice versa.

The correlation value between data elements j and k in the column calculated by the hardware module 110 may, as in the present example embodiment, be calculated as Pearson's correlation coefficient $r_{jk}$ (where $-1 \leq r_{jk} \leq 1$) for data elements j and k in the column, assuming that the reflectances recorded in the repeat B-scans for these data elements are two random variables. The correlation values may alternatively take the form of Spearman's ρ or Kendall's τ, for example, which differ from Pearson's correlation coefficient r by using ranks of the values, rather than the actual values. The use of Pearson's correlation coefficient r may be advantageous, as using ranks may fail to detect subtle correlations in some circumstances.

Referring again to FIG. 6, in process S20, the hardware component 110 uses the first data element $d_{OCTA}(i, j)$ and the calculated correlation value $r_{jk}$ to calculate a correction for the second data element $d_{OCTA}(i, k)$. The hardware component 110 may, as in the present example embodiment, calculate a correction value for the second data element $d_{OCTA}(i, k)$ by evaluating a correction function of a first variable and a second variable, which correction function increases with increasing values of the first variable and increasing values of the second variable, with the value of the first data element $d_{OCTA}(i, j)$ as a value of the first variable, and the calculated correlation value $r_{jk}$ as a value of the second variable. More particularly, the hardware component 110 may, as in the present example embodiment, calculate the correction for the second data element by evaluating a product of the first data element $d_{OCTA}(i, j)$, the calculated correlation value $r_{jk}$ and a scaling factor, s. Although the aforementioned function thus comprises a product of the first variable and the second variable in the present example embodiment, this is given by way of an example only, and the form of the function is not so limited.

The scaling factor may be a fixed number or it may, as in the present example embodiment, be user-adjustable so that a user of the apparatus 100 can set the value of the scaling factor via a user interface (e.g. a mouse and/or keyboard) connected to the apparatus 100 (e.g. to the communication interface (I/F) 610 of the programmable signal processing hardware illustrated in FIG. 5). The adjustment of the scaling factor is discussed further in the following, with reference to FIGS. 10 and 11.

In process S30 of FIG. 6, the hardware component 110 applies the calculated correction to the second data element $d_{OCTA}(i, k)$, specifically by subtracting the calculated correction value (or value based on the calculated correction value, e.g. a fraction of the calculated correction value) from the second data element $d_{OCTA}(i, k)$. If the result is less than zero, the second data element $d_{OCTA}(i, k)$ is set to zero.

In process S40 of FIG. 6, the hardware component 110 determines whether a predetermined criterion is met, for example, whether a predetermined number of OCTA data elements in each of a plurality of columns of the OCTA data 200 have been corrected so that an improved enface projection of the corrected OCTA data 300 can be generated.

In case the hardware component 110 determines in process S40 that the predetermined criterion has not been met, the process loops back to S10 via process S50, and processes S10 to S40 are then repeated using a different combination of a data element of the OCTA data 200 as the first data element and a data element of the OCTA data 200 as the second data element. By virtue of the first data element and/or second data element being changed in process S50, a new combination of a data element of the OCTA data 200 as the first data element and a data element of the OCTA data 200 as the second data element is used in each repeat of the sequence of processes S10 to S40, and the OCTA data 200 is consequently further corrected. At least some (and preferably all) of the columns of the OCTA data 200 are processed by this loop.

On the other hand, in case the hardware component 110 determines in process S40 that the predetermined criterion has been met, the process may stop, or alternatively proceed to optional process S60, as illustrated in FIG. 6, wherein the hardware component 110 generates an enface projection of the corrected OCTA data 300, and subsequently to optional process S70, wherein the output component 120 outputs the generated enface projection. In process S70, the output component 120 may display the enface projection on a display device (e.g. a computer screen) or store the enface projection in a storage device (e.g. a computer hard disk drive), for example.

The method performed by the hardware component 110 may, as in the present example embodiment, further comprise, in each performance of a plurality of the performances of processes S10, S20 and S30 to process OCTA data elements in a respective column of the OCTA data 200, as part of process S10 and before the calculation of the correlation value, an optional feature of processing each data element of a plurality of the data elements that are arranged from a starting data element in the column of the OCTA data 200, in turn (i.e. one by one, taking each data element in the column or every $n^{th}$ data element in the column, where n is an integer greater than or equal to 2) along the axial (z) direction along the column, by determining whether the data element exceeds an OCTA signal threshold, until a data element is determined to exceed the OCTA signal threshold.

The OCTA signal threshold may, as in the present example embodiment, be calculated as $\bar{I}+\tau_f \times \sigma_f$, where $\bar{I}$ is the mean of the values of the OCTA data elements in the OCTA data 200, $\sigma_f$ is the standard deviation of a Gaussian distribution which models the distribution of OCTA data element values in the OCTA data 200, and $\tau_f$ is a parameter for setting the OCTA signal threshold, which can preferably be adjusted by the user. The OCTA signal threshold need not be calculated in this way, however. The values of $\bar{I}$ and $\sigma_f$ may be obtained from a fit of a Gaussian function to the distribution of OCTA data element values, as in the present example embodiment, or from a fit of another function used to model the distribution of OCTA data element values in the OCTA data 200, or otherwise.

Regardless of how the OCTA signal threshold has been calculated, the data element which has been determined to exceed the OCTA signal threshold is then set as the first data element.

The optional feature set out above can identify an OCTA data element having a sufficiently large value, which may be taken to correspond to a significant source of a projection artefact, and which should therefore be taken into account in the PAR process. Conversely, other OCTA data elements, which have smaller values and are thus unlikely to contribute significantly to the projection artefact, are disregarded to avoid expending computational resources on processing operations that would have little impact on the results of the PAR process.

In the apparatus 100 of the example embodiment having the above optional feature, the plurality of performances of processes S10, S20 and S30 may comprise performing process S10 for a first time and then repeating process S10 to set a different respective data element in the column of the OCTA data 200 as the first data element in the performance of process S10 for the first time and in each repeat of process S10. In this case, in the performance of process S10 for the first time to set a data element of the plurality of the data elements in the column of the OCTA data 200 as the first data element, the hardware component 110 may be arranged to use a predetermined data element in the column of the OCTA data 200 as the starting data element. Furthermore, in each repeat performance of process S10, the hardware component 110 may be arranged to use a respective data element of the OCTA data 200, which has been set as the first data element in the preceding performance of process S10, as the starting data element. In this way, all OCTA data elements in the column having a sufficiently large value, which may be taken to correspond to a significant source of a projection artefact, can be identified and used in the PAR process, while others are discarded to avoid expending computational resources on processing operations that would have little impact on the results of the PAR process.

The predetermined data element may be a data element at an end of the column of the OCTA data 200. Alternatively, the predetermined data element may be a data element of a set of data elements in the column representing a first portion of the body part containing the vasculature, which data element is adjacent a boundary between the set of data elements and data elements in the column representing a second portion of the body part containing no vasculature. The predetermined data element may, for example, be a data element of a set of data elements in the column representing a retina of the eye, which data element is adjacent a boundary (the so-called Inner Limiting Membrane (ILM) boundary) between the set of data elements representing the retina and data elements in the column representing a vitreous body of the eye. Such data element can be found using well-known retinal layer segmentation algorithms, or by visual inspection of one or more OCT B-scans. Setting the starting data element to a data element associated with the ILM boundary allows the processing of OCTA data relating to the vitreous body of the eye, which contains no vasculature, to be avoided and to therefore make the generation of the corrected OCTA data 300 more efficient.

The method performed by the hardware component 110 may, as in the present example embodiment, further comprise, in each performance of a plurality of the performances of processes S10 to S30 to process data elements in a respective column of the OCTA data (200), as part of process S10 and before the calculation of the correlation value, a further optional feature of processing each data element of a plurality of data elements that are arranged from an initial data element in the column of the OCTA data 200, in turn (i.e. one by one, taking each data element in the column or every $n^{th}$ data element in the column, where n is an integer greater than or equal to 2) along the axial (z) direction, by determining whether a data element metric, which is based on at least some of the OCT data elements whose locations in respective B-scans of the repeat B-scans 251, 253, 255 and 257 correspond to the location of the data element in the array of columns of the OCTA data 200, exceeds an OCT value threshold, until a data element is processed for which the data element metric is determined to exceed the OCT value threshold. The data element for which the data element metric is determined to exceed the OCT value threshold element is set as the second data element.

The data element metric may be a mean of at least some (and preferably all) of the OCT data elements whose locations in respective B-scans of the repeat B-scans correspond to the location of the data element in the array of columns of the OCTA data 200. In the example of FIG. 7, for instance, the mean calculated as the data element metric may be a mean of one or more (preferably all) of data elements $d_{OCT1}(i, k)$, $d_{OCT2}(i, k)$, $d_{OCT3}(i, k)$ and $d_{OCT4}(i, k)$ of the OCT data 250. The data element metric may, however, be provided in a different form, for example as a median of at least some (preferably all) of the OCT data elements whose locations in respective B-scans of the repeat B-scans correspond to the location of the data element in the array of columns of the OCTA data 200. More generally, the data element metric may be any function of the OCT data elements whose locations in respective B-scans of the repeat B-scans correspond to the location of the data element in the array of columns of the OCTA data 200 being considered, which function returns an indication of their OCT signal size.

The further optional feature set out above allows an OCTA data element, which is below the first data element in the column, and which is derived from OCT data elements that are correspondingly located in respective B-scans of the set of repeat B-scans and correspond to OCT signal values measured from a region of relatively high reflectivity in the retina (or other body part), to be identified. An enface projection of OCTA data from such a region tends to exhibit more pronounced projection artefacts than enface projections of OCTA data from regions of lower reflectivity. Such identified OCTA data element is thus more likely to contain a significant "false flow" component than other OCTA data elements in the column that are derived from OCT data from a less reflective region, and should therefore be taken into account in the PAR process. Conversely, the other OCTA data elements in the column, which are derived from OCT data from a less reflective regions, are unlikely to contribute significantly to the projection artefact in an enface projection of the OCTA volume, and are disregarded to avoid expending computational resources on processing operations that would have little impact on the results of the PAR process.

In the apparatus 100 of the example embodiment having the above further optional feature, the plurality of performances of processes S10, S20 and S30 may comprise performing process S10 for a first time and then repeating process S10 to set a different respective data element in the column of the OCTA data 200 as the second data element in the performance of process S10 for the first time and in each repeat of process S10. In this case, in the performance of process S10 for the first time to set a data element in the column of the OCTA data 200 as the second data element, the hardware component 110 may use a data element of the OCTA data 200, whose location in the column of the OCTA data 200 corresponds to a location adjacent a location of the first data element in the column of the OCTA data 200 containing the first data element, as the initial data element. Furthermore, in each repeat of process S10, the hardware component 110 may use a respective data element of the OCTA data 200, which has been set as the second data element in the preceding performance of process S10, as the initial data element. In this way, all OCTA data elements in the column that are derived from OCT data elements measured in a region of relatively high reflectivity in the retina (or other body part) can be identified and used in the PAR process, while others are discarded to avoid expending computational resources on processing operations that would have little impact on the results of the PAR process.

An example of how process P (defined by the sequence of processes S10 to S30) of FIG. 6, as supplemented with the advantageous optional features set out above, may be performed multiple times to generate the corrected OCTA data 300 will now be described by reference to FIGS. 8A and 8B. To generate the corrected OCTA data 300, each column of a plurality of the columns of data elements of the OCTA data 200 is processed individually by the hardware component 110 in accordance with the processing described below with reference to FIGS. 8A and 8B, by using a different combination of a data element of the OCTA data 200 as the first data element and a data element of the OCTA data 200 as the second data element in each performance of the sequence of processes S10 to S30 on data elements in the column. The plurality (and preferably all) of the columns of data elements of the OCTA data 200 may be processed in the described way in parallel (simultaneously) by the hardware component 110, where computing resources with multiple threads or cores are available in a microprocessor(s) and/or graphics processing units (GPUs), to allow the corrected OCTA data 300 to be generated more quickly. The plurality of columns of data elements of the OCTA data 200 could alternatively be processed sequentially, or a combination of parallel and sequential processing could be used.

Figure 8A:
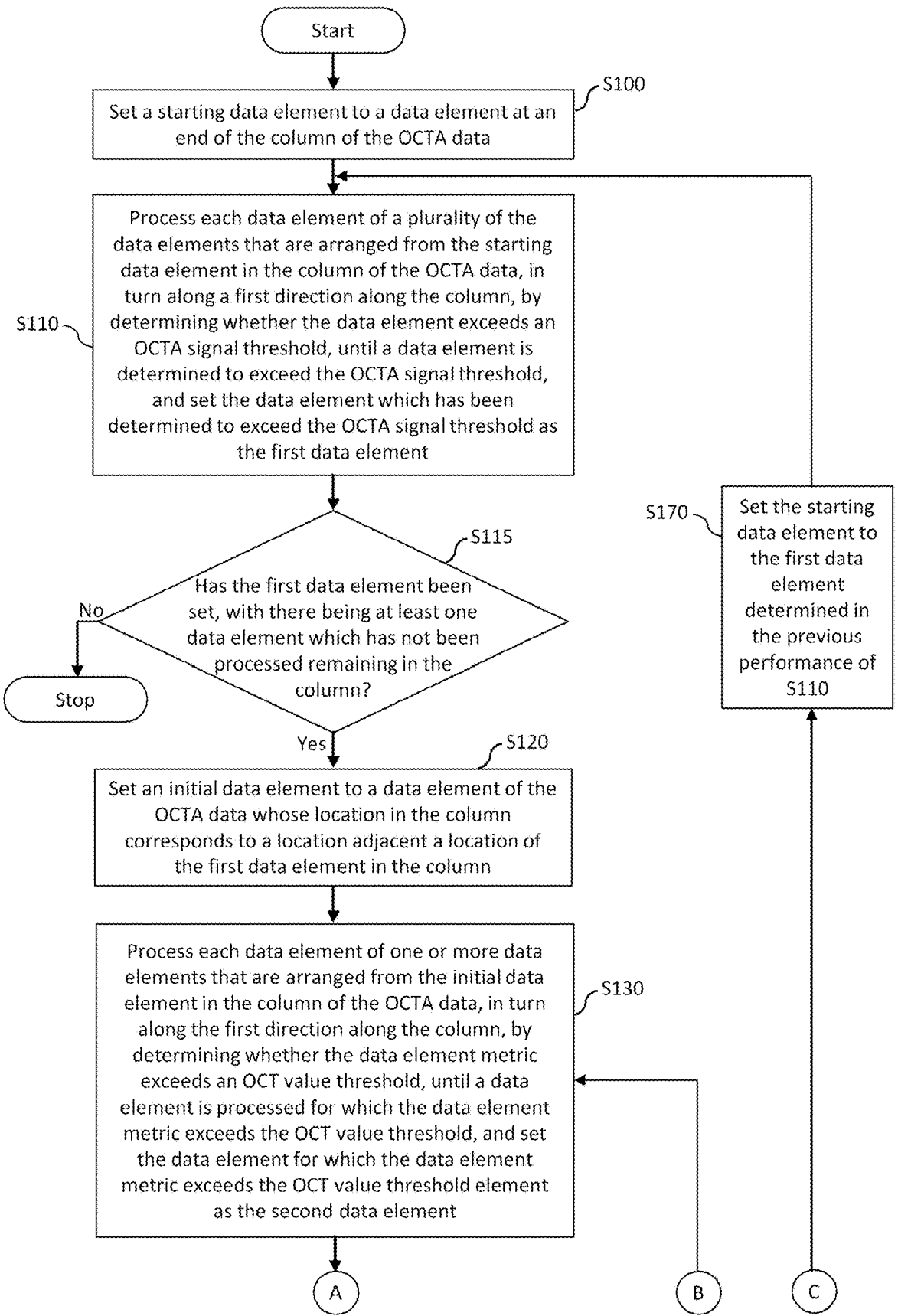
FIGS. 8A and 8B are a flow diagram illustrating an example implementation of the method of processing OCTA data of FIG. 6, according to an example embodiment.

In process S100 of FIG. 8A, the hardware component 110 sets a starting data element to a predetermined data element of the OCTA data 200. In the present example embodiment, the predetermined data element is the data element that appears at an end of the column of the OCTA data 200, specifically the first data element in the column, from which the remaining data elements are arranged in the axial (z) direction. Alternatively, the hardware component 110 may set a user-specified data element in the column of the OCTA data 200 as the starting data element, or a data element that has been automatically specified either by the hardware component 100 or by an external entity and then received by the hardware component 110. The predetermined data element may, for example, be a data element of a set of data elements in the column representing a retina of the eye (or, more generally, a first portion of the body part that contains vasculature of interest), which data element is adjacent a boundary (the so-called Inner Limiting Membrane (ILM) boundary) between the set of data elements representing the retina and data elements in the column representing a vitreous body of the eye (or, more generally, a second portion of the body part containing no vasculature). Such data element can be found using well-known retinal layer segmentation algorithms, or by visual inspection of one or more OCT B-scans. Setting the starting data element to a data element associated with the ILM boundary allows the processing of OCTA data relating to the vitreous body of the eye, which contains no vasculature, to be avoided and to therefore make the generation of the corrected OCTA data 300 more efficient.

In (optional) process S110 of FIG. 8A, the hardware component 110 processes each data element of a plurality of the data elements that are arranged from the starting data element in the column of the OCTA data, in turn along a first (z-axis, or 'axial') direction along the column, by determining whether the data element exceeds the OCTA signal threshold, until a data element is determined to exceed the OCTA signal threshold, and sets the data element which has been determined to exceed the OCTA signal threshold as the first data element. By way of an example, the hardware component 110 may thus determine whether OCTA data element $d_{OCTA}(i, 1)$ in column "i" is greater than the OCTA signal threshold and, if not, determine whether OCTA data element $d_{OCTA}(i, 2)$ is greater than the OCTA signal threshold. If OCTA data element $d_{OCTA}(i, 2)$ is not greater than the OCTA signal threshold, the hardware component 110 determines whether OCTA data element $d_{OCTA}(i, 3)$ is greater than the OCTA signal threshold, and repeats this cycle until it finds an OCTA data element greater than the OCTA signal threshold or reaches the end of the column being processed with no such OCTA data element having been found. In case an OCTA data element greater than the OCTA signal threshold is found, corrections need to be applied to all of the subsequent data elements that follow the data element which exceeds the OCTA signal threshold.

Process S110 serves to identify an OCTA data element having a sufficiently large value, which may be taken to correspond to a significant source of a projection artefact, and which should therefore be taken into account in the PAR process. Conversely, other OCTA data elements, which have smaller values and are thus unlikely to contribute significantly to the projection artefact, are disregarded in the present example embodiment to avoid expending computational resources on processing operations that would have little impact on the results of the PAR process.

Process S110 could, however, be replaced with a variant process wherein the OCTA data element designated as the first data element in any given performance of the variant process is replaced with the next (or next but one, next but two, etc.) OCTA data element in the next performance of the variant process. In such variant process, the contribution of OCTA data elements that might not contribute significantly as sources of the projection artefact would also be taken into account, thereby consuming computational resources without significant benefit.

In process S115 of FIG. 8A, the hardware component 110 determines whether the following condition is satisfied: the first data element has been set in process S110, with there being at least one data element which has not been processed remaining in the column. In case the hardware component determines that this condition is not satisfied ("No" following S115 in FIG. 8A), the processing ends. However, in case the hardware component 110 determines that this condition is satisfied ("Yes" following S115 in FIG. 8A), the processing proceeds to process S120. Process S115 is likewise optional, and can be omitted if processes S110 and S130 are replaced by their variants as herein described.

In process S120 of FIG. 8A, the hardware component 110 sets an initial data element to a data element of the OCTA data 200 that is adjacent the first data element in the column, i.e. the data element that is next to the first data element in the column, along the axial direction.

In (optional) process S130 of FIG. 8A, the hardware component 110 processes each data element of one or more data elements that are arranged from the initial data element in the column of the OCTA data 200, in turn along the axial (z) direction, by determining whether a data element metric, which is based on at least some of the OCT data elements whose locations in the respective B-scans of the repeat B-scans correspond to the location of the data element in the array of columns of the OCTA data 200, exceeds an OCT value threshold, and sets the data element for which the data element metric exceeds the OCT value threshold element (if any) as the second data element. The OCT value threshold may, as in the present example embodiment, be calculated as $\bar{b}+\tau_b \times \sigma_b$, where $\bar{b}$ is the mean of the values of the OCT data elements in the OCT data 250, $\sigma_b$ is the standard deviation of a Gaussian distribution which models the distribution of OCT data element values in the OCT data 250, and $\tau_b$ is a parameter for setting the OCT value threshold, which can preferably be adjusted by the user. The OCT value threshold need not be calculated in this way, however. The values of b and Op may be obtained from a fit of a Gaussian function to the distribution of OCT data element values, as in the present example embodiment, or from a fit of another function used to model the distribution of OCT data element values in the OCT data 250, or otherwise.

The data element metric may, as in the present example embodiment, be a mean of at least some (and preferably all) of the OCT data elements whose locations in respective B-scans of the repeat B-scans correspond to the location of the data element in the array of columns of the OCTA data 200. In the example of FIG. 7, for instance, the mean calculated as the data element metric may be a mean of one or more (preferably all) of data elements $d_{OCT1}(i, k)$, $d_{OCT2}(i, k)$, $d_{OCT3}(i, k)$ and $d_{OCT4}(i, k)$ of the OCT data 250. The data element metric may, however, be provided in a different form, for example as a median of at least some (preferably all) of the OCT data elements whose locations in respective B-scans of the repeat B-scans correspond to the location of the data element in the array of columns of the OCTA data 200. More generally, the data element metric may be any function of the OCT data elements whose locations in respective B-scans of the repeat B-scans correspond to the location of the data element in the array of columns of the OCTA data 200 being considered, which function returns an indication of their OCT signal size.

Process S130 serves to identify an OCTA data element which is below the first data element in the column, and which is derived from OCT data elements that are correspondingly located in respective B-scans of the set of repeat B-scans and correspond to OCT signal values measured from a region of relatively high reflectivity in the retina. An enface projection of OCTA data from such a region tends to exhibit more pronounced projection artefacts than enface projections of OCTA data from regions of lower reflectivity. Such OCTA data element identified in process S130 is thus more likely to contain a significant "false flow" component than other OCTA data elements in the column that are derived from OCT data from a less reflective retinal layer (or layers), and should therefore be taken into account in the PAR process. Conversely, the other OCTA data elements in the column, which are derived from OCT data from a less reflective retinal layer/layers, are unlikely to contribute significantly to the projection artefact in an enface projection of the OCTA volume, and are disregarded in the present example embodiment to avoid expending computational resources on processing operations that would have little impact on the results of the PAR process.

Process S130 could, however, be replaced with a variant process wherein the OCTA data element designated as the second data element in any given performance of the variant process is replaced with the next (or next but one, next but two, etc.) OCTA data element in the next performance of the variant process. In such variant process, the contribution of OCTA data elements that might not contribute significantly as sources of to the projection artefact would also be taken into account, thereby consuming computational resources without significant benefit.

Figure 8B:
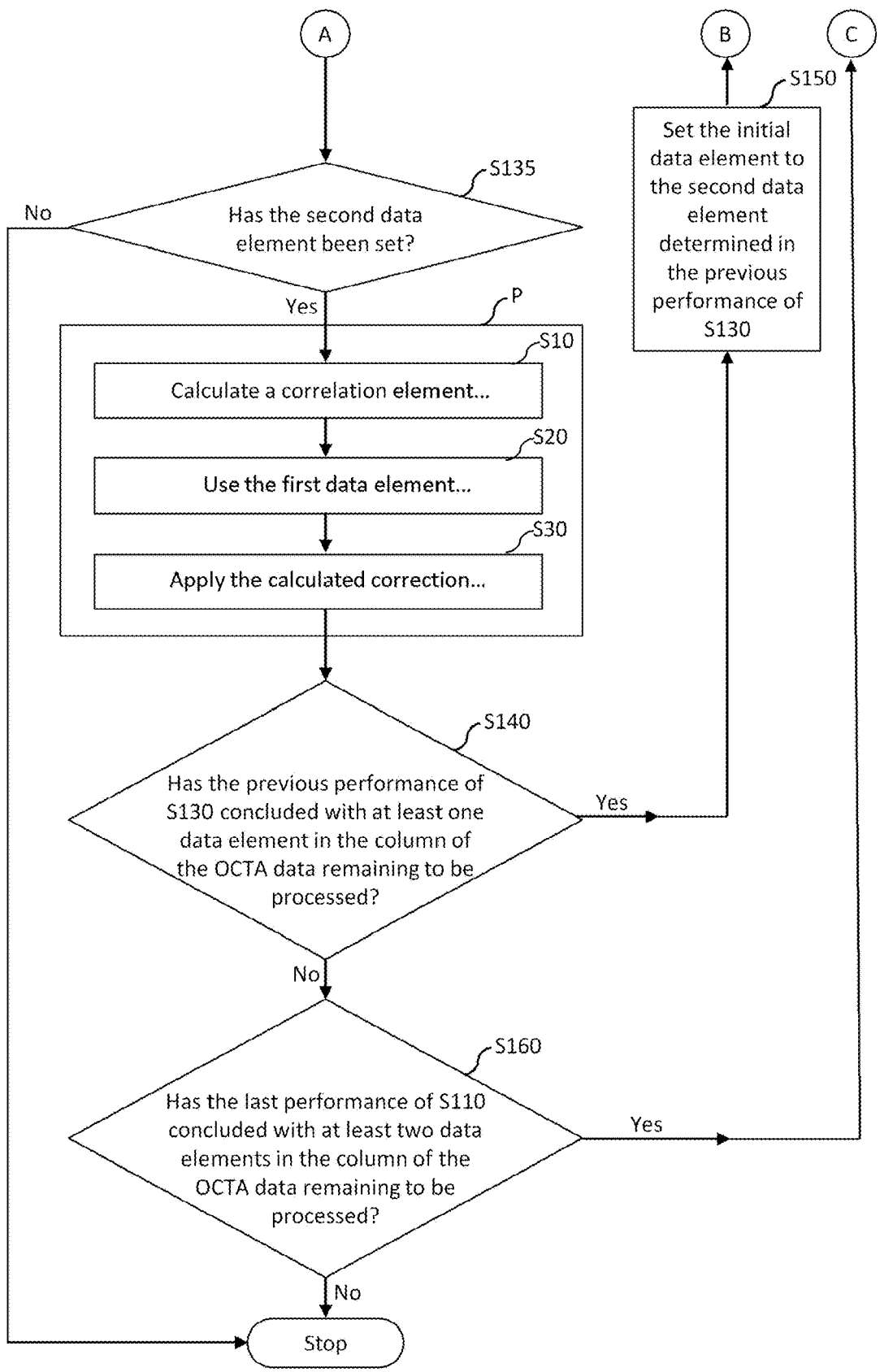

In process S135 of FIG. 8B, the hardware component 135 determines whether the second data element been set in process S130. In case the hardware component 110 determines that the second data element has not been set in process S130 ("No" following S135 in FIG. 8B), the processing ends. However, in case the hardware component 110 determines that the second data element has been set in process S130 ("Yes" following S135 in FIG. 8B), the processing proceeds to process P (comprising processes S10, S20 and S30), which has been described above in detail with reference to FIG. 6. Process S135 may be omitted if process S130 is replaced by its variant described above.

In process S140 of FIG. 8B, the hardware component 110 determines whether the previous performance of S130 concluded with at least one OCTA data element in the column of the OCTA data remaining to be processed. In case the hardware component 110 determines that the previous performance of S130 concluded with at least one OCTA data element in the column of the OCTA data remaining to be processed ("Yes" following S140 in FIG. 8B), the processing proceeds to process S150, wherein the hardware component 110 sets the initial data element to the second data element determined in the previous performance of S130. On the other hand, in case the hardware component 110 determines in process S140 that the previous performance of S130 did not conclude with at least one data element in the column of the OCTA data remaining to be processed ("No" following S140 in FIG. 8B), the processing proceeds to process S160 in FIG. 8B.

In process S160 of FIG. 8B, the hardware component 110 determines whether the previous performance of S110 concluded with at least two OCTA data elements in the column of the OCTA data 200 remaining to be processed. In case the hardware component 110 determines that the previous performance of S110 concluded with at least two OCTA data elements in the column of the OCTA data 200 remaining to be processed ("Yes" following S160 in FIG. 8B), the processing loops back to process S110 via process S170 in FIG. 8A, wherein the hardware component 110 sets the starting data element to the first data element determined in the previous performance of S110. On the other hand, in case the hardware component 110 determines that the previous performance of S110 did not conclude with at least two data elements in the column of the OCTA data 200 remaining to be processed ("No" following S160 in FIG. 8B), the processing of the column ends.

As noted above, the sequence of processes S10 to S30 is performed multiple times, using a different combination of a data element of the OCTA data 200 as the first data element and a data element of the OCTA data 200 as the second data element in each performance of the sequence of processes S10 to S30, so as to generate the corrected OCTA data 300. In other words, the combination of data elements of the OCTA data used as the first and second data elements in each performance of processes S10 to S30 differs from the combination of data elements of the OCTA data used as the first and second data elements in every other one of the performances of processes S10 to S30.

In each performance of process S20 in the execution of the process of FIGS. 8A and 8B, the hardware component 110 calculates the correction for the second data element $d_{OCTA}(i, k)$ as the product of the first data element $d_{OCTA}(i, j)$, the calculated correlation value $r_{jk}$ and the scaling factor s, with the first data element $d_{OCTA}(i, j)$ reflecting the previous corrections applied to $d_{OCTA}(i, j)$ by the OCTA data elements above it in the column being processed. On the other hand, the second data element $d_{OCTA}(i, k)$ is corrected not only on the basis of $d_{OCTA}(i, j)$ but also on the basis of OCTA data elements lower than $d_{OCTA}(i, j)$ but higher than $d_{OCTA}(i, k)$ in the column, during other performances of process S20.

Figure 9:
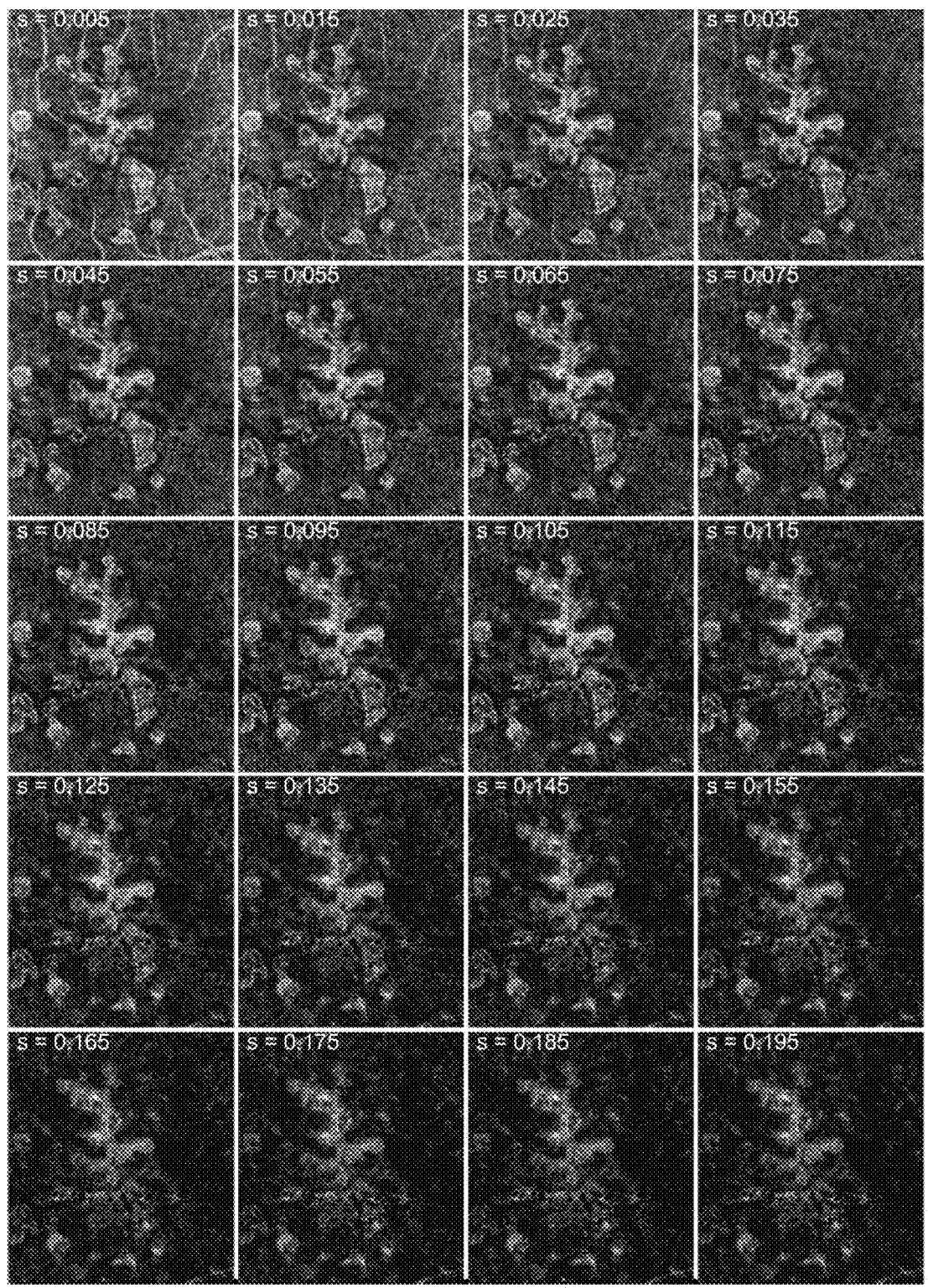
FIG. 9 shows a first set of OCTA enface projections of corrected OCTA data, which have been generated by the apparatus of the example embodiment using different values of a scaling factor, which determines the strength of the projection artefact correction.
Figure 10:
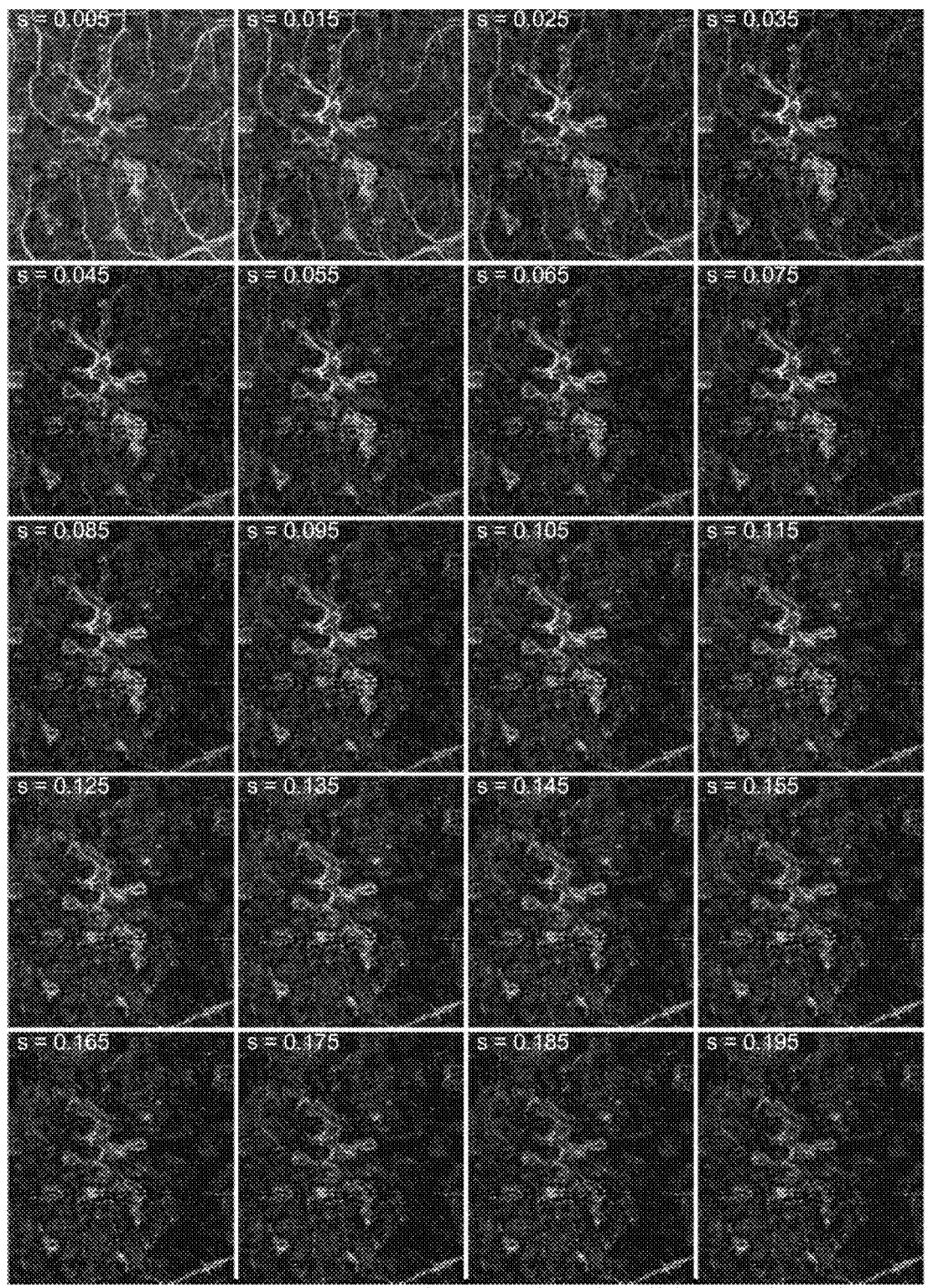
FIG. 10 shows a second set of OCTA enface projections of corrected OCTA data, which have been generated by the apparatus of the example embodiment using different values of the scaling factor.

As noted above, the scaling factor s used to calculate the correction for the second data element $d_{OCTA}(i, k)$ in process S20 may be adjustable by the user. FIGS. 9 and 10 show examples of OCTA enface projections of the corrected OCTA data 300 generated by the apparatus 100 of the present example embodiment. The grids of FIGS. 9 and 10 show results from the application of the PAR algorithm of FIGS. 8A and 8B to two respective OCTA volumes, where each grid cell shows an enface projection resulting from the use of the shown value of the scaling factor s in the PAR algorithm. As illustrated in FIG. 9, small values of s (e.g. 0.005 and 0.015) do not allow projection artefacts to be suppressed sufficiently, and these remain as 'ghost' vasculature in the enface projection images. Relatively high values of s, on the other hand, result in the projection artefacts being effectively suppressed but at the cost of degrading the quality of the imaged (genuine) vasculature. In the example of FIG. 9, values of s around 0.075 achieve a good balance between effective projection artefact suppression on the one hand, and vasculature image quality retention on the other. The same trends can be observed in FIG. 10, where a scaling factor value of about 0.075 likewise achieves a good balance between the aforementioned competing requirements.

Some of the embodiments described above are summarised in the following examples E1 to E16:

E1. An apparatus (100) arranged to process optical coherence tomography angiography, OCTA, data (200) comprising an array of columns of data elements which represents a distribution of vasculature in an imaged region of a body part, to generate corrected OCTA data (300) showing reduced projection artefacts in enface projection relative to the OCTA data (200), the data elements in each column of the array of columns having been generated from data elements of OCT data (250) that are correspondingly located in A-scans of respective B-scans of a set of repeat B-scans of the imaged region of the body part, the apparatus comprising:
  a hardware component (110) arranged to execute a method comprising processing data elements of the OCT data (250) and data elements of the OCTA data (200) by processes of:
  (i) calculating a correlation value that is indicative of a degree of correlation between
    a first sequence of data elements of the OCT data (250), wherein respective locations of the data elements of the first sequence within the respective B-scans correspond to a location of a first data element within the array of columns of the OCTA data (200), and
    a second sequence of data elements of the OCT data (250), wherein respective locations of the data elements of the second sequence within the respective B-scans correspond to a location of a second data element within the array of columns of the OCTA data (200), the second data element being further along in an axial direction of the OCTA data (200), in which the columns of the OCTA data (200) extend, than the first data element;
  (ii) using the first data element and the calculated correlation value to calculate a correction for the second data element; and
  (iii) applying the calculated correction to the second data element,
  the hardware component (110) being arranged to perform processes (i) to (iii) multiple times, using a different combination of a data element of the OCTA data (200) as the first data element and a data element of the OCTA data (200) as the second data element in each performance of processes (i) to (iii), so as to generate the corrected OCTA data (300); and
  an output component (120) arranged to output the corrected OCTA data (300).

E2. The apparatus (100) according to E1, wherein the method further comprises, in each performance of a plurality of the performances of processes (i) to (iii) to process data elements in a respective column of the OCTA data (200), as part of process (i) and before the calculation of the correlation value:
  processing each data element of a plurality of the data elements that are arranged from a starting data element in the column of the OCTA data (200), in turn along the axial direction along the column, by determining whether the data element exceeds an OCTA signal threshold, until a data element is determined to exceed the OCTA signal threshold, and setting the data element which has been determined to exceed the OCTA signal threshold as the first data element.

E3. The apparatus (100) according to E2, wherein the plurality of performances of processes (i) to (iii) comprises performing process (i) for a first time and then repeating process (i) to set a different respective data element in the column of the OCTA data (200) as the first data element in the performance of process (i) for the first time and in each repeat of process (i), and wherein
  in the performance of process (i) for the first time to set a data element of the plurality of the data elements in the column of the OCTA data (200) as the first data element, the hardware component (110) is arranged to use a predetermined data element in the column of the OCTA data (200) as the starting data element, and
  in each repeat performance of process (i), the hardware component (110) is arranged to use a respective data element of the OCTA data (200), which has been set as the first data element in the preceding performance of process (i), as the starting data element.

E4. The apparatus (100) according to E3, wherein the predetermined data element is one of:
  a data element at an end of the column of the OCTA data (200); or
  a data element of a set of data elements in the column representing a first portion of the body part containing the vasculature, which data element is adjacent a boundary between the set of data elements and data elements in the column representing a second portion of the body part containing no vasculature.

E5. The apparatus (100) according to any of E1 to E4, wherein the method further comprises, in each performance of a plurality of the performances of processes (i) to (iii) to process data elements in a respective column of the OCTA data (200), as part of process (i) and before the calculation of the correlation value:
  processing each data element of a plurality of data elements that are arranged from an initial data element in the column of the OCTA data (200), in turn along the axial direction, by determining whether a data element metric, which is based on at least some of the OCT data elements whose locations in respective B-scans of the repeat B-scans correspond to the location of the data element in the array of columns of the OCTA data (200), exceeds an OCT value threshold, until a data element is processed for which the data element metric is determined to exceed the OCT value threshold, and setting the data element for which the data element metric is determined to exceed the OCT value threshold element as the second data element.

E6. The apparatus (100) according to E5, wherein the plurality of performances of processes (i) to (iii) comprises performing process (i) for a first time and then repeating process (i) to set a different respective data element in the column of the OCTA data (200) as the second data element in the performance of process (i) for the first time and in each repeat of process (i), and wherein in the performance of process (i) for the first time to set a data element in the column of the OCTA data (200) as the second data element, the hardware component (110) is arranged to use a data element of the OCTA data (200), whose location in the column of the OCTA data (200) corresponds to a location adjacent a location of the first data element in a column of the OCTA data (200) containing the first data element, as the initial data element, and in each repeat of process (i), the hardware component (110) is arranged to use a respective data element of the OCTA data (200), which has been set as the second data element in the preceding performance of process (i), as the initial data element.

E8. The apparatus (100) according to E1, wherein the hardware component (110) is arranged to process each column of a plurality of the columns of data elements individually by performing processes (i) to (iii) using different combinations of data elements in the column as the first and second data elements, by:

(a) processing each data element of a plurality of the data elements that are arranged from a starting data element in the column of the OCTA data (200), in turn along a first direction along the column, by determining whether the data element exceeds an OCTA signal threshold, until a data element is determined to exceed the OCTA signal threshold, and setting the data element which has been determined to exceed the OCTA signal threshold as the first data element;

(b) processing each data element of one or more data elements that are arranged from an initial data element in the column of the OCTA data (200), in turn along the first direction along the column, by determining whether a data element metric, which is based on at least some of the OCT data elements whose locations in the respective B-scans of the repeat B-scans correspond to the location of the data element in the array of columns of the OCTA data (200), exceeds an OCT value threshold, until a data element is processed for which the data element metric is determined to exceed the OCT value threshold, and setting the data element for which the data element metric is determined to exceed the OCT value threshold element as the second data element;

(c) calculating a correlation value that is indicative of a degree of correlation between
a first sequence of data elements of the OCT data (250), wherein respective locations of the data elements of the first sequence within the respective B-scans correspond to a location of the first data element within the array of columns of the OCTA data (200), and
a second sequence of data elements of the OCT data (250), wherein respective locations of the data elements of the second sequence within the respective B-scans correspond to a location of the second data element within the array of columns of the OCTA data (200);

(d) using the first data element and the calculated correlation value to calculate a correction for the second data element;

(e) applying the calculated correction to the second data element;

(f) repeating processes (b) to (e), wherein
in a first performance of process (b), the initial data element is a data element of the OCTA data (200) whose location in the column corresponds to a location adjacent a location of the first data element in the column,
the initial data element in each repeat of process (b) is a data element in the column set as the second data element in the previous performance of process (b), and
processes (b) to (e) are repeated until there are no more data elements in the column of the OCTA data (200) to process in process (b); and (g) repeating processes (a) to (f), wherein
in a first performance of process (a), the starting data element is a predetermined data element in the column of the OCTA data (200),
the starting data element in each repeat of process (a) is a data element in the column set as the first data element in the previous performance of process (a), and
processes (a) to (f) are repeated until there are no more than two data elements in the column of the OCTA data (200) to process in process (a).

E9. The apparatus (100) according to E8, wherein the predetermined data element is one of:
a data element at an end of the column of the OCTA data (200); or
a data element of a set of data elements in the column representing a first portion of the body part containing the vasculature, which data element is adjacent a boundary between the set of data elements and data elements in the column representing a second portion of the body part containing no vasculature.

E10. The apparatus (100) according to claim E8 or E9, wherein the hardware component (110) is arranged to process the plurality of the columns of data elements in parallel by processes (a) to (g).

E11. The apparatus (100) according to any of E8 to E10, wherein the data element metric is one of a mean of at least some of the OCT data elements whose locations in respective B-scans of the repeat B-scans correspond to the location of the data element in the array of columns of the OCTA data (200), and a median of at least some of the OCT data elements whose locations in respective B-scans of the repeat B-scans correspond to the location of the data element in the array of columns of the OCTA data (200).

E12. The apparatus (100) according to any of E1 to E11, wherein the correlation value is one of a Pearson's correlation coefficient value, a Spearman's rank correlation coefficient value, and a Kendall rank correlation coefficient value.

E13. The apparatus (100) according to any of E1 to E12, wherein the hardware component (110) is arranged to calculate the correction for the second data element by evaluating a product of the first data element, the calculated correlation value and a scaling factor.

E14. The apparatus (100) according to any of E1 to E13, wherein
the hardware component (110) is further arranged to generate an enface projection of the corrected OCTA data (300); and
the output component (120) is arranged to output the generated enface projection.

E15. The apparatus (100) according to E14, wherein the output component (120) is arranged to display the generated enface projection on a display device.

E16. An imaging device (400) comprising:
- an imaging component (500) arranged to image a region of a body part and acquire optical coherence tomography angiography, OCTA, data (200) representing a distribution of vasculature in the imaged region of the body part; and the apparatus (100) according to any of E1 to E15, which is arranged to process the acquired OCTA data (200) to generate corrected OCTA data (300) having reduced projection artefacts in enface projection relative to the OCTA data (200).

Each column of the OCTA data 200 may, as in the example embodiment described above, be processed separately to 1) allow parallelisation where computing resources with multiple threads or cores are available in the microprocessors and/or graphics processing units (GPUs), and 2) simplify the correction methodology by ignoring effects caused by voxels in the nearby columns to the column being processed. From a physical perspective, a true model may take into account the scattering from vessels in the upper superficial retina layers that spreads to nearby columns. Other example embodiments may apply, for every voxel v that satisfies the source scattering properties within a column a, a correction to all target voxels below voxel v in all columns that are close to a, where closeness is defined by whether or not a column b falls inside a cone-of-influence defined for a with an apex or vertex at v, with axis parallel to a. A user may define the shape of the cone using geometric parameters (such as altitude and radius at the base, assuming a right-circular cone). In the example embodiments described herein, the cone-of-influence is effectively restricted to only span the same column a, such that only voxels below v in a are corrected.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

For example, in process S120 described above with reference to FIG. 8A, the hardware component 110 sets an initial data element to a data element of the OCTA data 200 that is next to the first data element in the column, along the axial (z-axis) direction. Then, in process S130 of FIG. 8A, the hardware component 110 processes each data element of one or more data elements that are arranged from the initial data element in the column of the OCTA data 200, in turn along the axial (z) direction. However, the order in which data elements underneath the first data element in the column are processed in process S130 is not limited to being along the axial direction but may alternatively be in the opposite direction. That is, the hardware component 110 may alternatively set the initial data element to a data element of the OCTA data 200 that is at the bottom end of the column, furthermost away from the first data element and then, in a modified form of process S130 of FIG. 8A, the hardware component 110 may process each data element of one or more data elements that are arranged from the initial data element in the column of the OCTA data 200, in turn along the negative axial (z-axis) direction, towards the first data element. Thus, the data elements in the column may be processed going up the column, rather than down the column (as in the example embodiment) in processes S120 to S150 of FIGS. 8A and 8B.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the invention, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The invention claimed is:

1. A computer-implemented method of processing optical coherence tomography angiography, OCTA, data comprising an array of columns of data elements, which represents a distribution of vasculature in an imaged region of a body part, to generate corrected OCTA data showing reduced projection artefacts in enface projection relative to the OCTA data, the data elements in each column of the array of columns having been generated from data elements of OCT data that are correspondingly located in A-scans of respective B-scans of a set of repeat B-scans of the imaged region of the body part, the method comprising processing data elements of the OCT data and data elements of the OCTA data by processes of:
 (i) calculating a correlation value that is indicative of a degree of correlation between
  a first sequence of data elements, of the OCT data, wherein respective locations of the data elements of the first sequence within the respective B-scans correspond to a location of a first data element within the array of columns of the OCTA data, and
  a second sequence of data elements of the OCT data, wherein respective locations of the data elements of the second sequence within the respective B-scans correspond to a location of a second data element within the array of columns of the OCTA data, the second data element being further along in an axial direction (z) of the OCTA data, in which the columns of the OCTA data extend, than the first data element;
 (ii) using the first data element and the calculated correlation value to calculate a correction for the second data element; and
 (iii) applying the calculated correction to the second data element,
 wherein processes (i) to (iii) are performed multiple times, using a different combination of a data element of the OCTA data as the first data element and a data element of the OCTA data as the second data element in each performance of processes (i) to (iii), so as to generate the corrected OCTA data.

2. The computer-implemented method of processing OCTA data according to claim 1, further comprising, in each performance of a plurality of the performances of processes (i) to (iii) to process data elements in a respective column of the OCTA data, as part of process (i) and before the calculation of the correlation value:
 processing each data element of a plurality of the data elements that are arranged from a starting data element in the column of the OCTA data, in turn along the axial direction along the column, by determining whether the data element exceeds an OCTA signal threshold, until a data element is determined to exceed the OCTA signal threshold, and setting the data element which has been determined to exceed the OCTA signal threshold as the first data element.

3. The computer-implemented method of processing OCTA data according to claim 2, wherein the plurality of performances of processes (i) to (iii) comprises performing process (i) for a first time and then repeating process (i) to set a different respective data element in the column of the OCTA data as the first data element in the performance of process (i) for the first time and in each repeat of process (i), and wherein
 in the performance of process (i) for the first time to set a data element of the plurality of the data elements in the column of the OCTA data as the first data element, a predetermined data element in the column of the OCTA data is used as the starting data element, and
 in each repeat performance of process (i), a respective data element of the OCTA data, which has been set as the first data element in the preceding performance of process (i), is used as the starting data element.

4. The computer-implemented method of processing OCTA data according to claim 3, wherein the predetermined data element is one of:
- a data element at an end of the column of the OCTA data; or
- a data element of a set of data elements in the column representing a first portion of the body part containing the vasculature, which data element is adjacent a boundary between the set of data elements and data elements in the column representing a second portion of the body part containing no vasculature.

5. The computer-implemented method of processing OCTA data according to claim 1, further comprising, in each performance of a plurality of the performances of processes (i) to (iii) to process data elements in a respective column of the OCTA data, as part of process (i) and before the calculation of the correlation value:
- processing each data element of a plurality of data elements that are arranged from an initial data element in the column of the OCTA data, in turn along the axial direction, by determining whether a data element metric, which is based on at least some of the OCT data elements whose locations in respective B-scans of the repeat B-scans correspond to the location of the data element in the array of columns of the OCTA data, exceeds an OCT value threshold, until a data element is processed for which the data element metric is determined to exceed the OCT value threshold, and setting the data element for which the data element metric is determined to exceed the OCT value threshold element as the second data element.

6. The computer-implemented method of processing OCTA data according to claim 5, wherein the plurality of performances of processes (i) to (iii) comprises performing process (i) for a first time and then repeating process (i) to set a different respective data element in the column of the OCTA data as the second data element in the performance of process (i) for the first time and in each repeat of process (i), and wherein
- in the performance of process (i) for the first time to set a data element in the column of the OCTA data whose location in the column of the OCTA data corresponds to a location adjacent a location of the first data element in a column of the OCTA data containing the first data element is used as the initial data element, and
- in each repeat of process (i), a respective data element of the OCTA data set as the second data element in the preceding performance of process (i) is used as the initial data element.

7. The computer-implemented method of processing OCTA data according to claim 5, wherein the data element metric is one of a mean of at least some of the OCT data elements whose locations in respective B-scans of the repeat B-scans correspond to the location of the data element in the array of columns of the OCTA data, and a median of at least some of the OCT data elements whose locations in respective B-scans of the repeat B-scans correspond to the location of the data element in the array of columns of the OCTA data.

8. The computer-implemented method of processing OCTA data according to claim 1, wherein each column of a plurality of the columns of data elements is processed individually by performing processes (i) to (iii) using different combinations of data elements in the column as the first and second data elements, by:
(a) processing each data element of a plurality of the data elements that are arranged from a starting data element in the column of the OCTA data, in turn along a first direction along the column, by determining whether the data element exceeds an OCTA signal threshold, until a data element is determined to exceed the OCTA signal threshold, and setting the data element which has been determined to exceed the OCTA signal threshold as the first data element;
(b) processing each data element of one or more data elements that are arranged from an initial data element in the column of the OCTA data, in turn along the first direction along the column, by determining whether a data element metric, which is based on at least some of the OCT data elements whose locations in the respective B-scans of the repeat B-scans correspond to the location of the data element in the array of columns of the OCTA data, exceeds an OCT value threshold, until a data element is processed for which the data element metric is determined to exceed the OCT value threshold, and setting the data element for which the data element metric is determined to exceed the OCT value threshold element as the second data element;
(c) calculating a correlation value that is indicative of a degree of correlation between
- a first sequence of data elements of the OCT data, wherein respective locations of the data elements of the first sequence within the respective B-scans correspond to a location of the first data element within the array of columns of the OCTA data, and
- a second sequence of data elements of the OCT data, wherein respective locations of the data elements of the second sequence within the respective B-scans correspond to a location of the second data element within the array of columns of the OCTA data;
(d) using the first data element and the calculated correlation value to calculate a correction for the second data element;
(e) applying the calculated correction to the second data element;
(f) repeating processes (b) to (e), wherein
- in a first performance of process (b), the initial data element is a data element of the OCTA data whose location in the column corresponds to a location adjacent a location of the first data element in the column,
- the initial data element in each repeat of process (b) is a data element in the column set as the second data element in the previous performance of process (b), and
- processes (b) to (e) are repeated until there are no more data elements in the column of the OCTA data to process in process (b); and
(g) repeating processes (a) to (f), wherein
- in a first performance of process (a), the starting data element is a predetermined data element in the column of the OCTA data,
- the starting data element in each repeat of process (a) is a data element in the column set as the first data element in the previous performance of process (a), and
- processes (a) to (f) are repeated until there are no more than two data elements in the column of the OCTA data to process in process (a).

9. The computer-implemented method of processing OCTA data according to claim 8, wherein the predetermined data element is one of:

a data element at an end of the column of the OCTA data; or a data element of a set of data elements in the column representing a first portion of the body part containing the vasculature, which data element is adjacent a boundary between the set of data elements and data elements in the column representing a second portion of the body part containing no vasculature.

10. The computer-implemented method of processing OCTA data according to claim 8, wherein the plurality of the columns of data elements is processed in parallel by processes (a) to (g).

11. The computer-implemented method of processing OCTA data according to claim 1, wherein the correlation value is one of a Pearson's correlation coefficient value, a Spearman's rank correlation coefficient value, and a Kendall rank correlation coefficient value.

12. The computer-implemented method of processing OCTA data according to claim 1, wherein the correction for the second data element is calculated by evaluating a product of the first data element, the calculated correlation value and a scaling factor.

13. The computer-implemented method of processing OCTA data according to claim 1, further comprising:
generating an enface projection of the corrected OCTA data; and
outputting the generated enface projection.

14. An apparatus arranged to process optical coherence tomography angiography, OCTA, data comprising an array of columns of data elements which represents a distribution of vasculature in an imaged region of a body part, to generate corrected OCTA data showing reduced projection artefacts in enface projection relative to the OCTA data, the data elements in each column of the array of columns having been generated from data elements of OCT data that are correspondingly located in A-scans of respective B-scans of a set of repeat B-scans of the imaged region of the body part, the apparatus comprising:
a hardware component arranged to execute a method comprising processing data elements of the OCT data and data elements of the OCTA data by processes of:
(i) calculating a correlation value that is indicative of a degree of correlation between
a first sequence of data elements of the OCT data, wherein respective locations of the data elements of the first sequence within the respective B-scans correspond to a location of a first data element within the array of columns of the OCTA data, and
a second sequence of data elements of the OCT data, wherein respective locations of the data elements of the second sequence within the respective B-scans correspond to a location of a second data element within the array of columns of the OCTA data, the second data element being further along in an axial direction of the OCTA data, in which the columns of the OCTA data extend, than the first data element;
(ii) using the first data element and the calculated correlation value to calculate a correction for the second data element; and
(iii) applying the calculated correction to the second data element,
the hardware component being arranged to perform processes (i) to (iii) multiple times, using a different combination of a data element of the OCTA data as the first data element and a data element of the OCTA data as the second data element in each performance of processes (i) to (iii), so as to generate the corrected OCTA data; and
an output component arranged to output the corrected OCTA data.

15. The apparatus according to claim 14, wherein the method further comprises, in each performance of a plurality of the performances of processes (i) to (iii) to process data elements in a respective column of the OCTA data, as part of process (i) and before the calculation of the correlation value:
processing each data element of a plurality of the data elements that are arranged from a starting data element in the column of the OCTA data, in turn along the axial direction along the column, by determining whether the data element exceeds an OCTA signal threshold, until a data element is determined to exceed the OCTA signal threshold, and setting the data element which has been determined to exceed the OCTA signal threshold as the first data element.

16. The apparatus according to claim 15, wherein the plurality of performances of processes (i) to (iii) comprises performing process (i) for a first time and then repeating process (i) to set a different respective data element in the column of the OCTA data as the first data element in the performance of process (i) for the first time and in each repeat of process (i), and wherein
in the performance of process (i) for the first time to set a data element of the plurality of the data elements in the column of the OCTA data as the first data element, the hardware component is arranged to use a predetermined data element in the column of the OCTA data as the starting data element, and
in each repeat performance of process (i), the hardware component is arranged to use a respective data element of the OCTA data, which has been set as the first data element in the preceding performance of process (i), as the starting data element.

17. The apparatus according to claim 14, wherein the method further comprises, in each performance of a plurality of the performances of processes (i) to (iii) to process data elements in a respective column of the OCTA data, as part of process (i) and before the calculation of the correlation value:
processing each data element of a plurality of data elements that are arranged from an initial data element in the column of the OCTA data, in turn along the axial direction, by determining whether a data element metric, which is based on at least some of the OCT data elements whose locations in respective B-scans of the repeat B-scans correspond to the location of the data element in the array of columns of the OCTA data, exceeds an OCT value threshold, until a data element is processed for which the data element metric is determined to exceed the OCT value threshold, and setting the data element for which the data element metric is determined to exceed the OCT value threshold element as the second data element.

18. The apparatus according to claim 17, wherein the plurality of performances of processes (i) to (iii) comprises performing process (i) for a first time and then repeating process (i) to set a different respective data element in the column of the OCTA data as the second data element in the performance of process (i) for the first time and in each repeat of process (i), and wherein
in the performance of process (i) for the first time to set a data element in the column of the OCTA data as the second data element, the hardware component is arranged to use a data element of the OCTA data, whose location in the column of the OCTA data corresponds to a location adjacent a location of the first data element in a column of the OCTA data containing the first data element, as the initial data element, and in each repeat of process (i), the hardware component is arranged to use a respective data element of the OCTA data, which has been set as the second data element in the preceding performance of process (i), as the initial data element.

19. The apparatus according to claim 14, wherein the hardware component is arranged to process each column of a plurality of the columns of data elements individually by performing processes (i) to (iii) using different combinations of data elements in the column as the first and second data elements, by:

(a) processing each data element of a plurality of the data elements that are arranged from a starting data element in the column of the OCTA data, in turn along a first direction along the column, by determining whether the data element exceeds an OCTA signal threshold, until a data element is determined to exceed the OCTA signal threshold, and setting the data element which has been determined to exceed the OCTA signal threshold as the first data element;

(b) processing each data element of one or more data elements that are arranged from an initial data element in the column of the OCTA data, in turn along the first direction along the column, by determining whether a data element metric, which is based on at least some of the OCT data elements whose locations in the respective B-scans of the repeat B-scans correspond to the location of the data element in the array of columns of the OCTA data, exceeds an OCT value threshold, until a data element is processed for which the data element metric is determined to exceed the OCT value threshold, and setting the data element for which the data element metric is determined to exceed the OCT value threshold element as the second data element;

(c) calculating a correlation value that is indicative of a degree of correlation between
a first sequence of data elements of the OCT data, wherein respective locations of the data elements of the first sequence within the respective B-scans correspond to a location of the first data element within the array of columns of the OCTA data, and
a second sequence of data elements of the OCT data, wherein respective locations of the data elements of the second sequence within the respective B-scans correspond to a location of the second data element within the array of columns of the OCTA data;

(d) using the first data element and the calculated correlation value to calculate a correction for the second data element;

(e) applying the calculated correction to the second data element;

(f) repeating processes (b) to (e), wherein
in a first performance of process (b), the initial data element is a data element of the OCTA data whose location in the column corresponds to a location adjacent a location of the first data element in the column,
the initial data element in each repeat of process (b) is a data element in the column set as the second data element in the previous performance of process (b), and processes (b) to (e) are repeated until there are no more data elements in the column of the OCTA data to process in process (b); and (g) repeating processes (a) to (f), wherein
in a first performance of process (a), the starting data element is a predetermined data element in the column of the OCTA data,
the starting data element in each repeat of process (a) is a data element in the column set as the first data element in the previous performance of process (a), and
processes (a) to (f) are repeated until there are no more than two data elements in the column of the OCTA data to process in process (a).

20. An imaging device comprising:
an imaging component arranged to image a region of a body part and acquire optical coherence tomography angiography, OCTA, data representing a distribution of vasculature in the imaged region of the body part; and
an apparatus arranged to process the acquired OCTA data to generate corrected OCTA data having reduced projection artefacts in enface projection relative to the OCTA data, wherein the OCTA data comprises an array of columns of data elements which represents a distribution of vasculature in an imaged region of a body part, the data elements in each column of the array of columns having been generated from data elements of OCT data that are correspondingly located in A-scans of respective B-scans of a set of repeat B-scans of the imaged region of the body part, the apparatus comprising:
a hardware component arranged to execute a method comprising processing data elements of the OCT data and data elements of the OCTA data by processes of:
(i) calculating a correlation value that is indicative of a degree of correlation between
a first sequence of data elements of the OCT data, wherein respective locations of the data elements of the first sequence within the respective B-scans correspond to a location of a first data element within the array of columns of the OCTA data, and
a second sequence of data elements of the OCT data, wherein respective locations of the data elements of the second sequence within the respective B-scans correspond to a location of a second data element within the array of columns of the OCTA data, the second data element being further along in an axial direction of the OCTA data, in which the columns of the OCTA data extend, than the first data element;
(ii) using the first data element and the calculated correlation value to calculate a correction for the second data element; and
(iii) applying the calculated correction to the second data element,
the hardware component being arranged to perform processes (i) to (iii) multiple times, using a different combination of a data element of the OCTA data as the first data element and a data element of the OCTA data as the second data element in each performance of processes (i) to (iii), so as to generate the corrected OCTA data; and
an output component arranged to output the corrected OCTA data.

* * * * *